United States Patent
Nakamura et al.

(10) Patent No.: US 9,022,163 B2
(45) Date of Patent: May 5, 2015

(54) GEAR SHIFT CONTROL DEVICE OF SADDLE RIDE TYPE VEHICLE

(75) Inventors: Kenta Nakamura, Wako (JP); Yuzuru Ishikawa, Wako (JP); Shinichi Karube, Wako (JP); Taichi Mori, Wako (JP); Ippei Kawamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 13/595,114

(22) Filed: Aug. 27, 2012

(65) Prior Publication Data

US 2013/0055841 A1    Mar. 7, 2013

(30) Foreign Application Priority Data

Sep. 7, 2011 (JP) .................................. 2011-195332

(51) Int. Cl.
*B62M 25/06* (2006.01)
*B62K 23/08* (2006.01)

(52) U.S. Cl.
CPC ........... *B62M 25/06* (2013.01); *Y10T 74/20055* (2015.01); *B62K 23/08* (2013.01)

(58) Field of Classification Search
USPC ................ 180/336, 218, 219, 230; 74/473.16
IPC ...... B62M 25/06; B62K 23/08; Y10T 74/20055
See application file for complete search history.

(56) References Cited

U.S. PATENT DOCUMENTS

| | | | | |
|---|---|---|---|---|
| 6,012,351 A | * | 1/2000 | Ysker | .................... 74/473.15 |
| 7,264,099 B2 | * | 9/2007 | Duignan | ...................... 192/43.1 |
| 7,264,255 B1 | * | 9/2007 | Winfrey | ........................ 180/219 |
| 7,467,682 B1 | * | 12/2008 | Hahm | ............................ 180/230 |
| 8,365,856 B2 | * | 2/2013 | Kashiwai et al. | ............. 180/230 |
| 8,403,093 B2 | * | 3/2013 | Kosugi et al. | ................. 180/230 |
| 8,678,125 B2 | * | 3/2014 | Kosugi et al. | ................. 180/230 |
| 2004/0093974 A1 | * | 5/2004 | Nesseth | ...................... 74/473.12 |
| 2010/0212448 A1 | | 8/2010 | Sato | |

FOREIGN PATENT DOCUMENTS

| | | | |
|---|---|---|---|
| EP | 1936224 A2 | 6/2008 | |
| JP | 02039216 A | * 2/1990 | ............... G05G 1/14 |
| JP | 05-088605 A | 4/1993 | |

* cited by examiner

*Primary Examiner* — Faye M Fleming
(74) *Attorney, Agent, or Firm* — Westerman, Hattori, Daniels & Adrian, LLP

(57) ABSTRACT

A gear shift control device of a saddle ride type vehicle includes an operation pedal; a movable part which includes a movable member interlocking with and connected to the operation pedal and which has at least one of a click mechanism configured to give click feeling to an operation of the operation pedal, a stopper mechanism configured to restrict a turning operation range of the operation pedal, and a return mechanism configured to apply a spring force in a return direction to the operation pedal; and a detector which detects a gear shift operation performed by using the operation pedal, the gear shift control device configured to make a transmission perform a gear shift on the basis of a detection result of the detector.

20 Claims, 17 Drawing Sheets

GEAR SHIFT CONTROL DEVICE OF SADDLE RIDE TYPE VEHICLE

CROSS-REFERENCE TO RELATED APPLICATION

This application claims foreign priority to Japanese Patent Application No. 2011-195332, filed Sep. 7, 2011, the entire contents of which are incorporated herein by reference.

TECHNICAL FIELD

The present invention relates to a gear shift control device of a saddle ride type vehicle including: an operation pedal which is operated to turn by the foot of a rider to perform gear shift; a movable part which includes a movable member interlocking with and connected to the operation pedal and which also includes at least one of a click mechanism configured to give click feeling to an operation of the operation pedal, a stopper mechanism configured to restrict a turning operation range of the operation pedal, and a return mechanism configured to apply a spring force in a return direction to the operation pedal; and a detector which detects a gear shift operation performed by using the operation pedal, the gear shift control device configured to make a transmission perform a gear shift on the basis of a detection result of the detector.

BACKGROUND OF THE INVENTION

Japanese Patent Application Publication No. Hei 5-88605 discloses a gear shift control device for performing a shift-up operation and a shift-down operation by foot in a simulator apparatus simulating a motorcycle.

In the device disclosed in Hei 5-88605, an operation pedal and a movable arm connected to the operation pedal via a link rod are disposed at such a distance in a front-a front-rear direction that movable ranges of the operation pedal and the movable arm do not overlap with each other. If this structure is applied to a saddle ride type vehicle such as a motorcycle as it is, an engine and a vehicle body within the movable ranges of the operation pedal, the movable arm, and the link rod cannot be provided with any protrusion or the like which causes interference during operation. Hence, freedom in layout of the engine and the vehicle body is impaired.

SUMMARY OF THE INVENTION

The present disclosure has been made in view of the situations described above and provides a gear shift control device of a saddle ride type vehicle, which enables improvement of freedom in layout of an engine and a vehicle body in such a way that a movable part and an operation pedal are disposed close to each other while being kept from interfering with each other during operation.

For the purpose of solving the above-mentioned problems, a first characteristic provides a gear shift control device of a saddle ride type vehicle, including: an operation pedal which is operated to turn by the foot of a rider to perform gear shift; a movable part which includes a movable member interlocking with and connected to the operation pedal and which also includes at least one of a click mechanism configured to give click feeling to an operation of the operation pedal, a stopper mechanism configured to restrict a turning operation range of the operation pedal, and a return mechanism configured to apply a spring force in a return direction to the operation pedal; and a detector which detects a gear shift operation performed by using the operation pedal, the gear shift control device configured to make a transmission perform a gear shift on the basis of a detection result of the detector, wherein the operation pedal and the movable part are disposed in such a way that a movable range of the movable part is offset from a movable range of the operation pedal in a vehicle width direction.

In addition to the configuration of the first characteristic, in a second characteristic, the operation pedal and the movable part are disposed to partially overlap each other in a side view.

In addition to the configuration of the first characteristic, in a third characteristic, a foot-movement restriction portion configured to restrict the foot of the rider placed on the operation pedal from moving inward in the vehicle width direction is fixedly disposed inside the operation pedal in the vehicle width direction, and the movable range of the movable part in the vehicle width direction is disposed inside the foot-movement restriction portion in the vehicle width direction.

In addition to the configuration of any of the first to third characteristics, in a fourth characteristic, the operation pedal is turnably supported by a step holder attached to a pivot frame which forms part of a vehicle body frame while swingably supporting a front end portion of a swing arm whose rear end portion pivotally supports a rear wheel, and the movable part is supported by a supporting member disposed inside the pivot frame in the vehicle width direction and attached to the vehicle body frame.

In addition to the configuration of the fourth characteristic, in a fifth characteristic, the supporting member is attached to a side stand bracket fixedly attached to the vehicle body frame to support a side stand.

In addition to the configuration of any of the first to third characteristics, in a sixth characteristic, the operation pedal is turnably supported by a bracket which is fixedly attached to an engine main body mounted on the vehicle body frame and which is arranged lateral to the engine main body, and the movable part is disposed below the engine main body.

According to the first characteristic described above, the movable range of the movable part is offset from the movable range of the operation pedal in the vehicle width direction. Accordingly, the movable part and the operation pedal can be disposed close to each other while being kept from interfering with each other during operation. By reducing the space occupied by the movable part and the operation pedal, freedom in layout of the engine and the vehicle body can be improved.

According to the second characteristic described above, the operation pedal and the movable part partially overlap each other in the side view. This allows reduction of space occupied by the movable part and the operation pedal.

According to the third characteristic described above, the foot-movement restriction portion fixedly disposed inside the operation pedal in the vehicle width direction restricts the foot of the rider from moving inward in the vehicle width direction, and the movable range of the movable part in the vehicle width direction is disposed inside the foot-movement restriction portion in the vehicle width direction. Accordingly, it is possible to avoid interference between the movable part and the foot of the rider placed on the operation pedal.

According to the fourth characteristic described above, the operation pedal is turnably supported by the step holder attached to the pivot frame forming part of the vehicle body frame, and the movable part is supported by the supporting member disposed inside the pivot frame in the vehicle width direction and attached to the vehicle body frame. Accordingly, the movable part and the operation pedal can be easily disposed to be offset from each other in the vehicle width direction with the movable part being protected.

According to the fifth characteristic described above, the supporting member supporting the movable part is attached to the side stand bracket. This configuration allows the supporting member to be attached to the side stand bracket in a vehicle equipped with no gear shift control device operated by foot, and facilitates application of the gear shift control device of the present invention.

According to the sixth characteristic described above, the operation pedal is turnably supported by the bracket which is fixedly attached to the engine main body mounted on the vehicle body frame and which is arranged lateral to the engine main body, and the movable part is disposed below the engine main body. Accordingly, the operation pedal and the movable part can be easily disposed to be offset from each other in the vehicle width direction.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
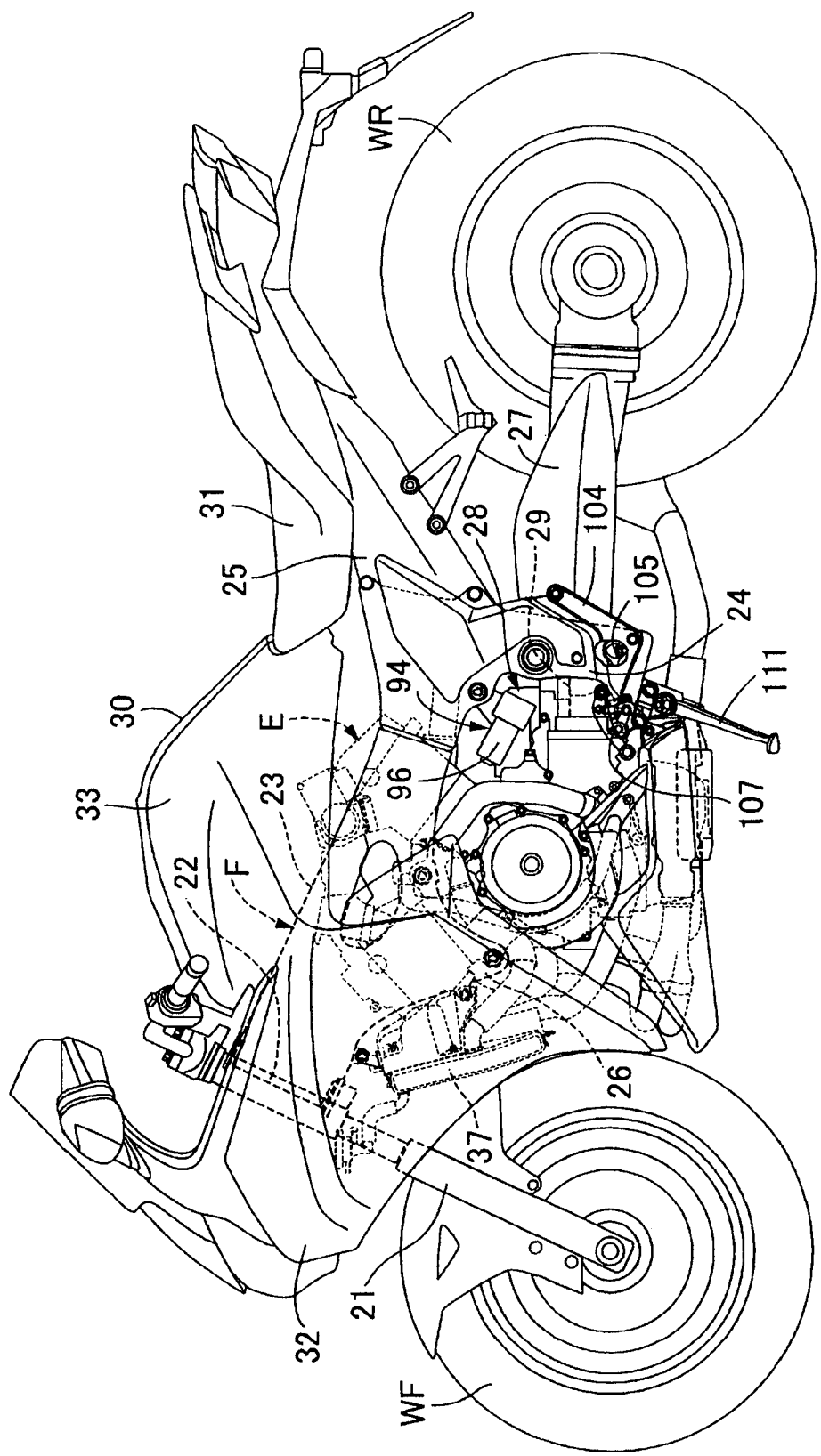
FIG. 1 is a side view of a motorcycle of a first embodiment.

Embodiments of the present invention are described with reference to the attached drawings. In the description below, front, rear, right, left, up, and down refer to directions as seen from a rider riding a motorcycle.

A first embodiment of the present invention is described with reference to FIGS. 1 to 10. First in FIG. 1, a vehicle body frame F of the motorcycle has: a head pipe 22 which steerably supports a front fork 21 pivotally supporting a front wheel WF; a pair of right and left main frames 23, 23 which extend downward toward the rear from the head pipe 22; a pair of right and left pivot frames 24, 24 which extend downward and which are provided continuously with rear portions of the main frames 23, 23; and a pair of right and left rear frames 25, 25 which extend upward toward the rear from the pivot frames 24, 24. Engine hangers 26, 26 extending downward from intermediate portions of the main frames 23, 23 are provided integrally and continuously with the main frames 23, 23. Moreover, a rear wheel WR is pivotally supported by a rear portion of a swing arm 27 whose front end is swingably supported by the pivot frames 24, 24.

An engine main body 28 of a water-cooled engine E is disposed below the main frames 23, 23. The engine main body 28 is suspended from and mounted on lower portions of the engine hangers 26, 26, the main frames 23, 23, and the pivot frames 24, 24. A rotational power outputted from the engine E is transmitted to the rear wheel WR via a drive shaft 29 extending in a front-rear direction inside the swing arm 27.

A fuel tank 30 is mounted on the main frames 23 . . . and a rider seat 31 is provided on the rear frames 25, 25, behind the fuel tank 30.

Part of the vehicle body frame F and part of the engine E are covered with a vehicle body cover 32. The vehicle body cover 32 has a tank cover 33 covering most of the fuel tank 30 from sides.

Figure 2:
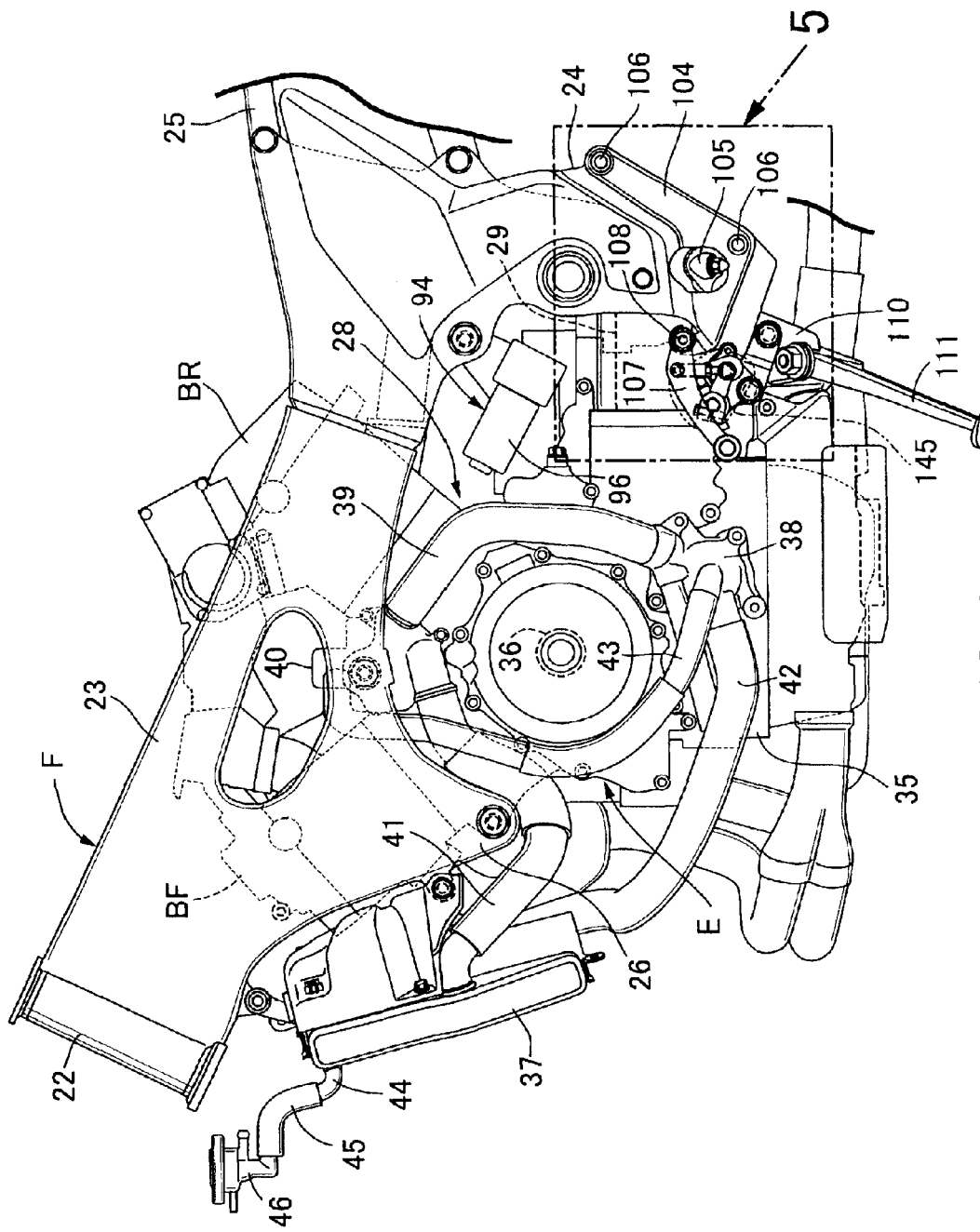
FIG. 2 is an enlarged side view around an engine.

Referring also to FIG. 2, the engine main body 28 is configured to be a V-type engine including a front bank BF located in a front portion of the engine main body 28 being mounted on the motorcycle, and a rear bank BR located behind the front bank BF. A crankshaft 36 extending along a right-left direction of the motorcycle is rotatably supported by a crankcase 35 common to both of the banks BF and BR.

A radiator 37 is disposed in front of the engine main body 28. Moreover, a water pump 38 rotationally driven by the crankshaft 36 is attached to a left face of a lower portion of the crankcase 35. A water supply hose 39 continuous with an outlet of the water pump 38 is connected to a water jacket supply part provided in a space between the front and rear banks BF, BR. Coolant water is supplied to water jackets of both banks BF, BR from the water jacket supply part. Moreover, a thermostat 40 is disposed in the space between the front and rear banks BF, BR. In a state where the engine E is warmed up, the coolant water having passed through the water jackets is transmitted from the thermostat 40 to the radiator 37 via a return hose 41. The coolant water cooled by the radiator 37 is returned to the water pump 38 via a hose 42. Furthermore, in a state where the engine E is not warmed up, part of the coolant water from the thermostat 40 is returned to the water pump 38 via a bypass hose 43.

A water supply tube 44 is provided in an upper portion of the radiator 37. A filler pipe 46 is connected to an upper end of a water supply hose 45 being continuous with the water supply tube 44 and extending upward.

Figure 3:
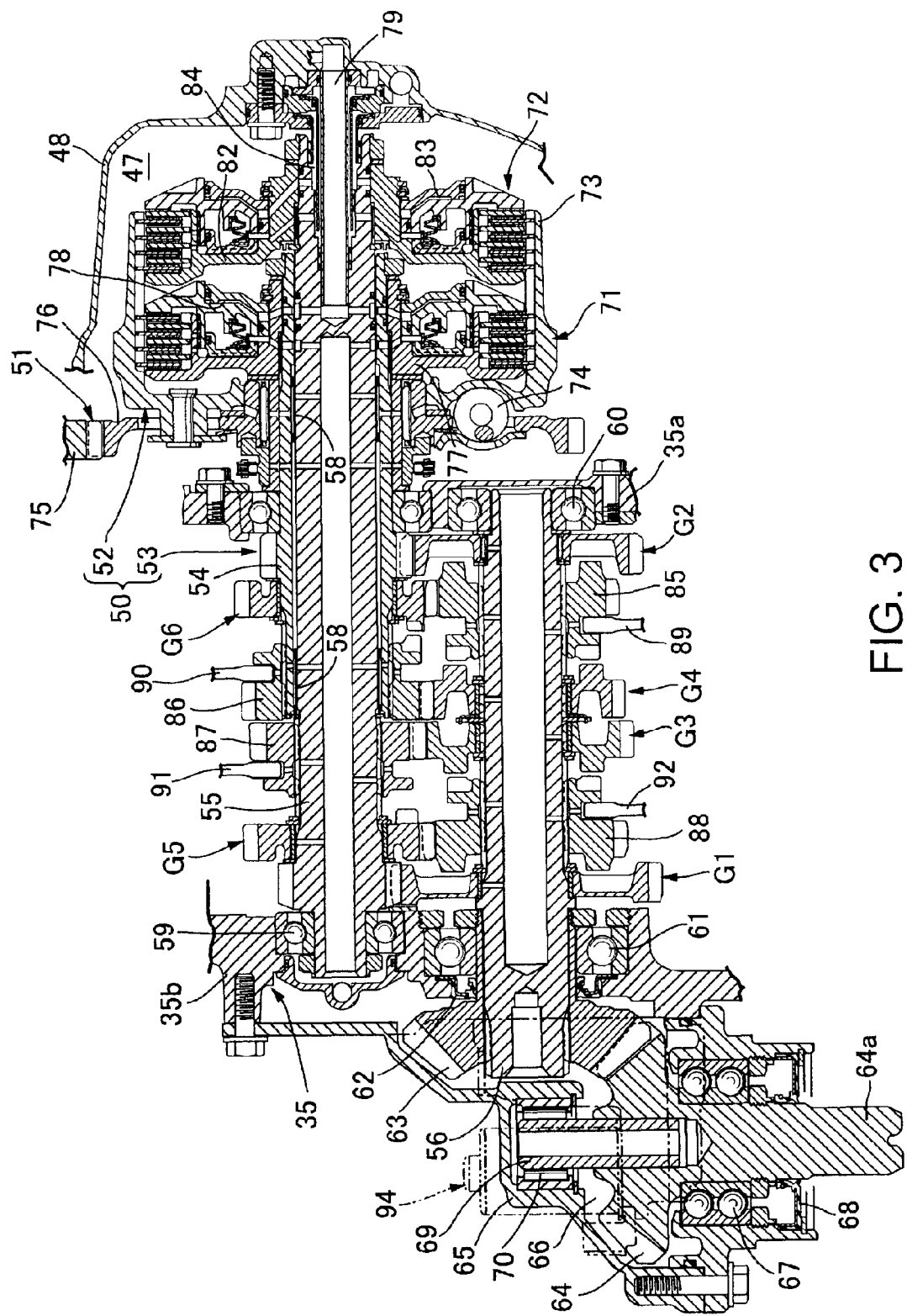
FIG. 3 is a vertical cross-sectional view of a gear transmission mechanism and a clutch device.

In FIG. 3, a clutch cover 48 forming a clutch chamber 47 between the clutch cover 48 and the crankcase 35 is joined to a right face of the crankcase 35 in a state where the engine main body 28 is mounted on the vehicle body frame F. A power transmission path between the crankshaft 36 and the rear wheel WR includes a primary reduction device 51, a clutch device 52, a gear transmission mechanism 53, and the drive shaft 29 (see FIGS. 1 and 2) in this order from a side close to the crankshaft 36. A transmission 50 is formed of the clutch device 52 and the gear transmission mechanism 53. The primary reduction device 51 and the clutch device 52 are housed in the clutch chamber 47 and the gear transmission mechanism 53 is housed in the crankcase 35.

The gear transmission mechanism 53 is housed in the crankcase 35 and includes gear trains of multiple gear speeds which can be selectively established, such as first to sixth speed gear trains G1, G2, G3, G4, G5, G6. The gear transmission mechanism 53 is formed such that the second, fourth, and sixth speed gear trains G2, G4, G6 are provided between a first main shaft 54 and a counter shaft 56 while the first, third, and fifth speed gear trains G1, G3, G5 are provided between the counter shaft 56 and a second main shaft 55 which coaxially penetrates the first main shaft 54 to be capable of rotating relative thereto.

The crankcase 35 includes a right wall 35a and a left wall 35b which face each other with a gap provided therebetween in the axial direction of the crankshaft 36. An intermediate portion of the first main shaft 54 rotatably penetrates the right wall 35a, the first main shaft 54 being formed in a cylindrical shape with an axis parallel to the crankshaft 36. A ball bearing 57 is interposed between the right wall 35a and the first main shaft 54. The second main shaft 55 having an axis parallel to the crankshaft 36 penetrates the first main shaft 54 to be capable of rotating relative thereto, with the position of the second main shaft 55 relative to the first main shaft 54 in the axial direction kept constant. Multiple needle bearings 58 . . . are interposed between the first main shaft 54 and the second main shaft 55. Moreover, the other end portion of the second main shaft 55 is rotatably supported by the left wall 35b of the crankcase 35 via a ball bearing 59.

One end portion of the counter shaft 56 having an axis parallel to the crankshaft 36 is rotatably supported by the right wall 35a via a ball bearing 60. The other end portion of the counter shaft 56 rotatably penetrates the left wall 35b with a ball bearing 61 and an annular sealing member 62 interposed between the other end portion and the left wall 35b. A driving bevel gear 63 is fixed to an end portion of the counter shaft 56 which protrudes from the left wall 35b. A driven bevel gear 64 having a rotating axis extending in the front-rear direction of the motorcycle meshes with the driving bevel gear 63.

The driving bevel gear 63 and the driven bevel gear 64 mesh with each other in a gear chamber 66 formed by the left wall 35b of the crankcase 35 and a gear cover 65 which is attachably and detachably joined to the left wall 35b to partially cover the left wall 35b. A shaft portion 64a which the driven bevel gear 64 coaxially includes rotatably penetrates the gear cover 65. A ball bearing 67 and an annular sealing member 68 located outside the ball bearing 67 are interposed between the shaft portion 64a and the gear cover 65. Moreover, one end portion of a supporting shaft 69 is fitted to the driven bevel gear 64 and the other end portion of the supporting shaft 69 is rotatably supported by the gear cover 65 via a roller bearing 70. The shaft portion 64a is connected to the drive shaft 29.

The clutch device 52 forming the transmission 50 together with the gear transmission mechanism 53 is a twin type including first and second clutches 71, 72 provided between the gear transmission mechanism 53 and the crankshaft 36. The clutch device 52 is housed in the clutch chamber 47. The first clutch 71 is provided between the crankshaft 36 and one end portion of the first main shaft 54. The second clutch 72 is provided between the crankshaft 36 and one end portion of the second main shaft 55. The power from the crankshaft 36 is inputted to a clutch outer 73 common to the first and second clutches 71, 72 via the primary reduction device 51 and a damper spring 74.

The primary reduction device 51 is formed of a driving gear 75 which is provided in the crankshaft 36 and a driven gear 76 which is supported by the first main shaft 54 to be capable of rotating relative thereto and which meshes with the driving gear 75. The driven gear 76 is connected to the clutch outer 73 via the damper spring 74.

The first clutch 71 is configured to switch between disconnection and connection of power between the clutch outer 73 and a first clutch inner 77, according to oil pressure control of a first oil pressure chamber 78, the first clutch inner 77 coaxially surrounded by the clutch outer 73 and joined to the first main shaft 54 to be incapable of rotating relative thereto. A first oil passage 79 communicating with the first oil pressure chamber 78 is formed in the second main shaft 55.

The second clutch 72 is arranged side by side with the first clutch 71 in the axial direction of the second main shaft 55 with the first clutch 71 interposed between the second clutch 72 and the primary reduction device 51. The second clutch 72 is configured to switch between disconnection and connection of power between the clutch outer 73 and a second clutch inner 82 according to oil pressure control of a second oil pressure chamber 83, the second clutch inner 82 coaxially surrounded by the clutch outer 73 and joined to the second main shaft 55 to be incapable of rotating relative thereto. A second oil passage 84 communicating with the second oil pressure chamber 83 is formed in the second main shaft 55 separately from the first oil passage 79.

The gear transmission mechanism 53 includes first, second, third, and fourth shifters 85, 86, 87, 88 which are capable of working in the axial directions of both main shafts 54, 55 and the counter shaft 56 to switch between an established state and a non-established state of the first to sixth speed gear trains G1, G2, G3, G4, G5, G6. The shifters 85 to 88 are embraced respectively by the first to fourth shift forks 89, 90, 91, 92.

Figure 4:
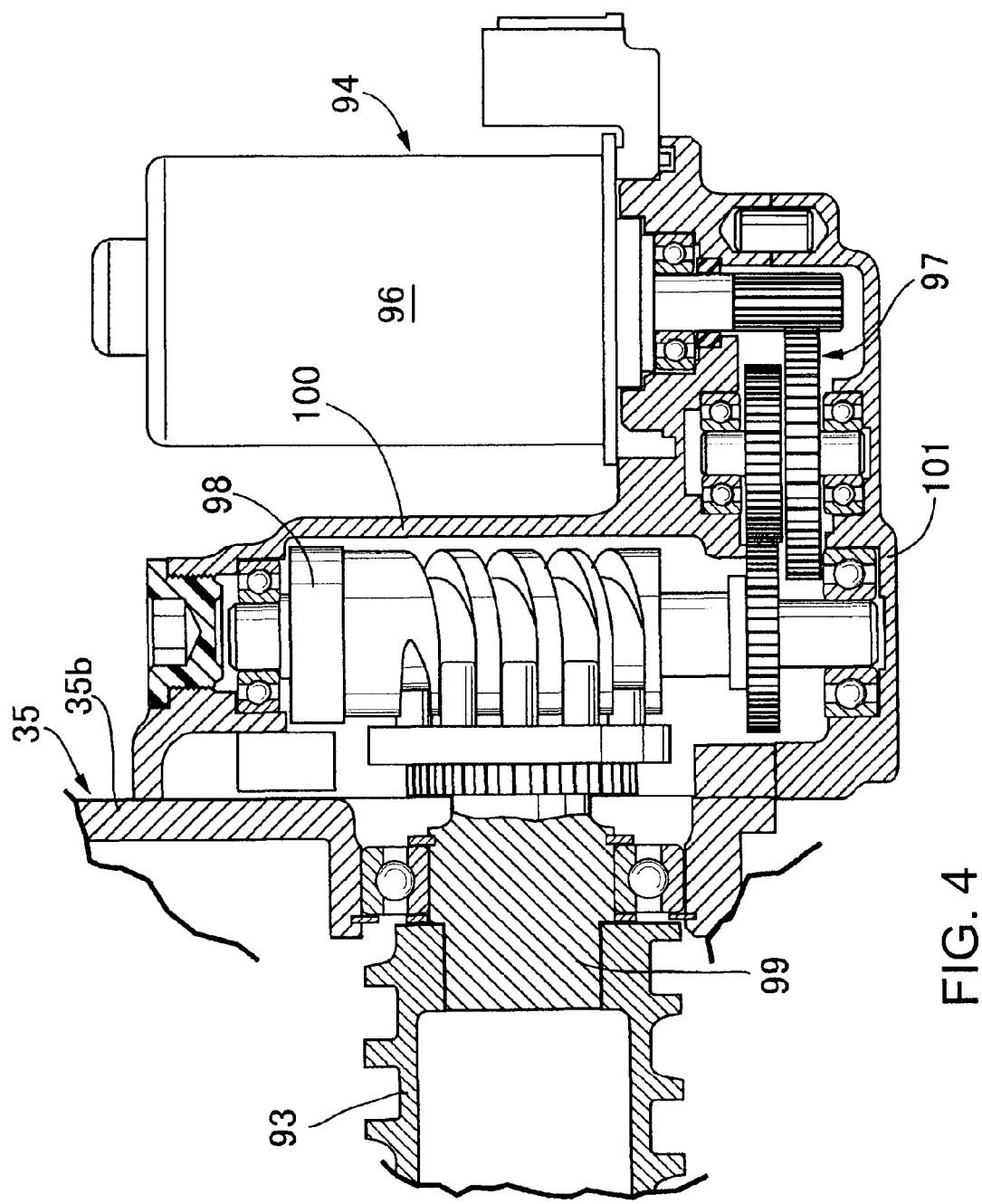
FIG. 4 is a vertical cross-sectional view of a shift drum and a shift actuator.

In FIG. 4, a shift drum 93 having an axis parallel to both main shafts 54, 55 and the counter shaft 56 is supported rotatably about an axis by the right and left walls 35a, 35b of the crankcase 35. The first to fourth shift forks 89 to 92 engage with an outer periphery of the shift drum 93. The first to fourth shift forks 89 to 92, i.e. the first to fourth shifters 85 to 88 thus work in the axial directions of both main shafts 54, 55 and the counter shaft 56 in accordance with the rotation of the shift drum 93.

The established state and the non-established state of the first to sixth speed gear trains G1 to G6 in the gear transmission mechanism 53 is switched by causing the shift drum 93 to rotate. A shift actuator 94 which changes the rotational position of the shift drum 93 is attached to the outer face of the left wall 35b of the crankcase 35.

The shift actuator 94 includes: an electric motor 96 which exerts a rotational power; a gear reduction mechanism 97 which transmits the rotational power of the electric motor 96 while reducing the output revolution of the electric motor 96; a barrel cam 98 which interlocks with and is connected to the gear reduction mechanism 97 to rotate by the power transmitted from the gear reduction mechanism 97 and convert the rotating movement thereof into a rotating movement of the shift drum 93; and a disc-shaped transmission rotation member 99 which is coaxially and fixedly attached to the shift drum 93 to transmit the power to the shift drum 93 according to the rotation of the barrel cam 98.

A case member 100 housing the gear reduction mechanism 97, the barrel cam 98, and the transmission rotation member 99 is fastened to the left wall 35b of the crankcase 35. A lid member 101 is attached to the case member 100 to close an open end of the case member 100. The electric motor 96 is attached to the case member 100 from a side opposite to the lid member 101.

A gear shift of the transmission 50 formed of the clutch device 52 and the gear transmission mechanism 53 is performed by combining a work of the shift actuator 94 and a work of oil pressure control valves (not shown) which control the oil pressures of the first and second oil pressure chambers 78, 83 in the clutch device 52.

Figure 5:
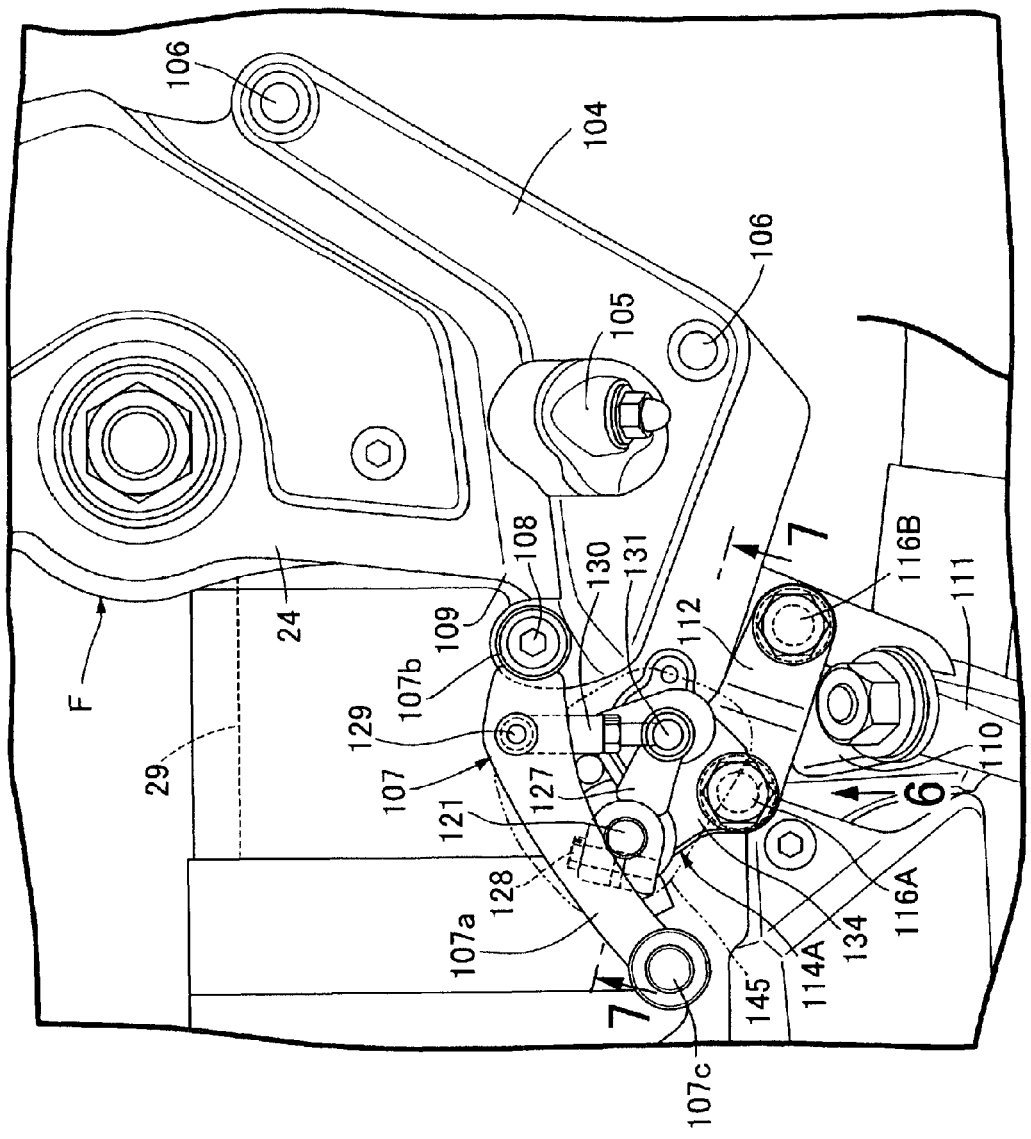
FIG. 5 is an enlarged view of a portion indicated by the arrow 5 of FIG. 2.

In FIG. 5, a step holder 104 provided with a step 105 for placing the left foot of the rider is attached to the lower portion of the left pivot frame 24 forming part of the vehicle body frame F, by using, for example, a pair of bolts 106, 106. An operation pedal 107 which can be operated by being turned by the toe of the left foot placed on the step 105 is turnably supported by the step holder 104. The operation pedal 107 is formed of: an arm portion 107*a* extending in a front-rear direction; a cylindrical supported portion 107*b* provided at a rear end of the arm portion 107*a*; and a pedal portion 107*c* provided in a front end portion of the arm portion 107*a*. The supported portion 107*b* is turnably supported by a front end portion of the step holder 104 via a supporting shaft 108 having an axis extending in a vehicle width direction.

Moreover, the step 105 is provided on the step holder 104 at a position corresponding to a substantial center portion of the pivot frame 24 in the front-rear direction and the operation pedal 107 extends forward from the front end portion of the step holder 104. Accordingly, a lower front portion of the left pivot frame 24 serves as a foot-movement restriction portion 109 fixedly disposed inside the operation pedal 107 in the vehicle width direction to restrict the left foot of the rider placed on the operation pedal 107 from moving inward in the vehicle width direction.

A side stand bracket 110 forming part of the vehicle body frame F is fixedly attached to the lower portion of the left pivot frame 24. A side stand 111 for parking the motorcycle with the motorcycle inclined to the left is turnably attached to the side stand bracket 110.

Figure 6:
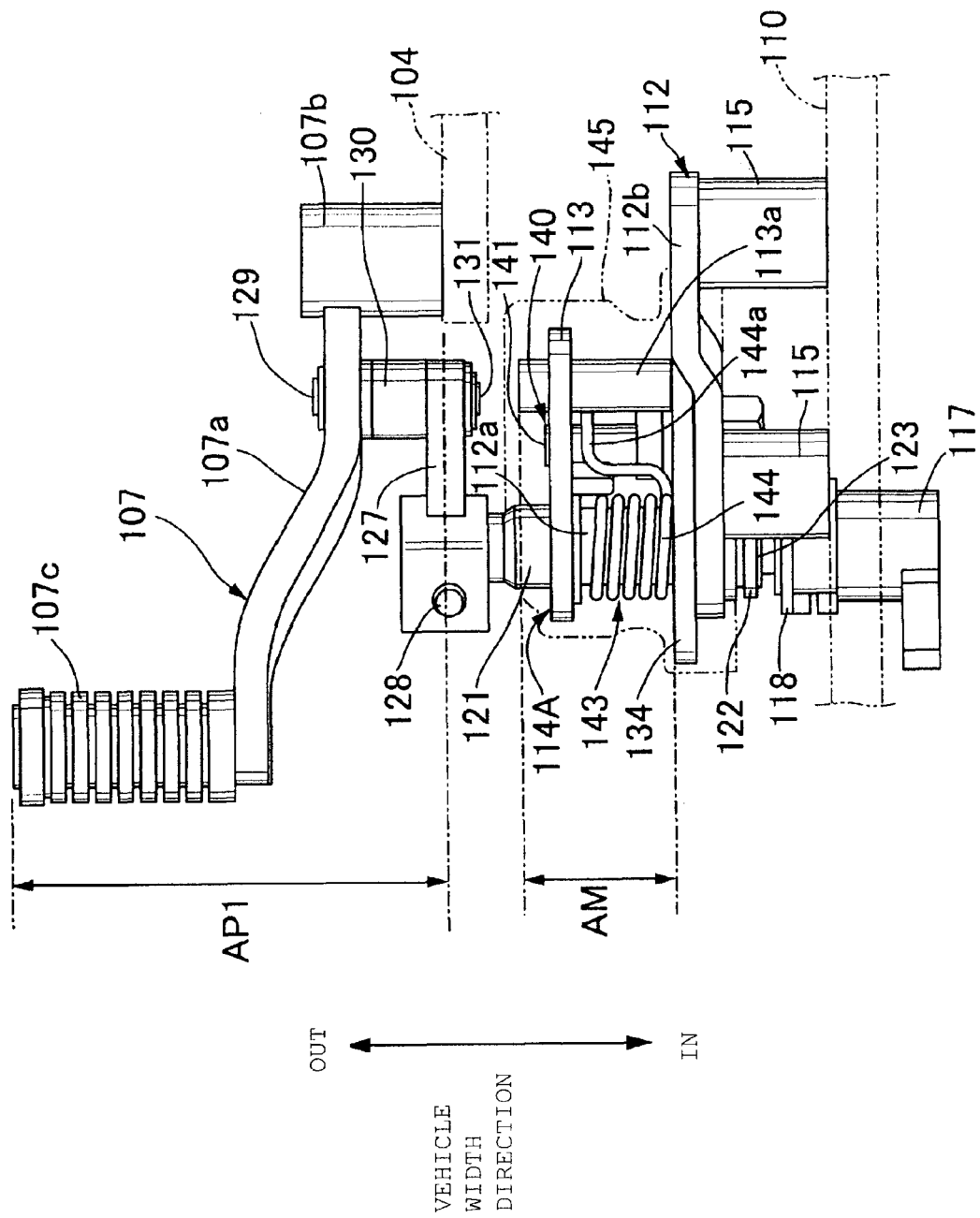
FIG. 6 is an enlarged view of an operation pedal, a movable part, and a detector as seen in a direction of the arrow 6 of FIG. 5.
Figure 7:
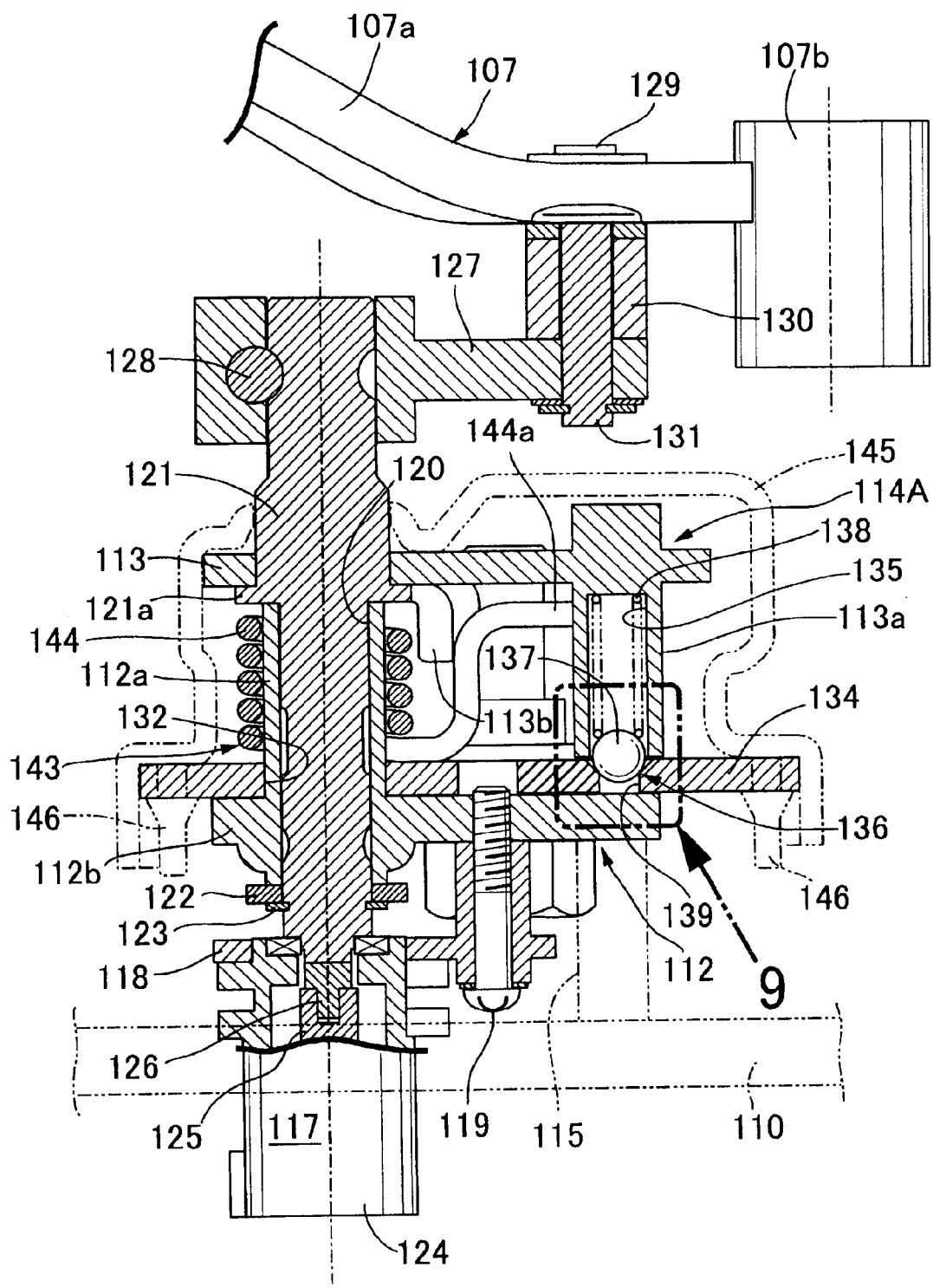
FIG. 7 is an enlarged cross-sectional view taken along the line 7-7 of FIG. 5.
Figure 8:
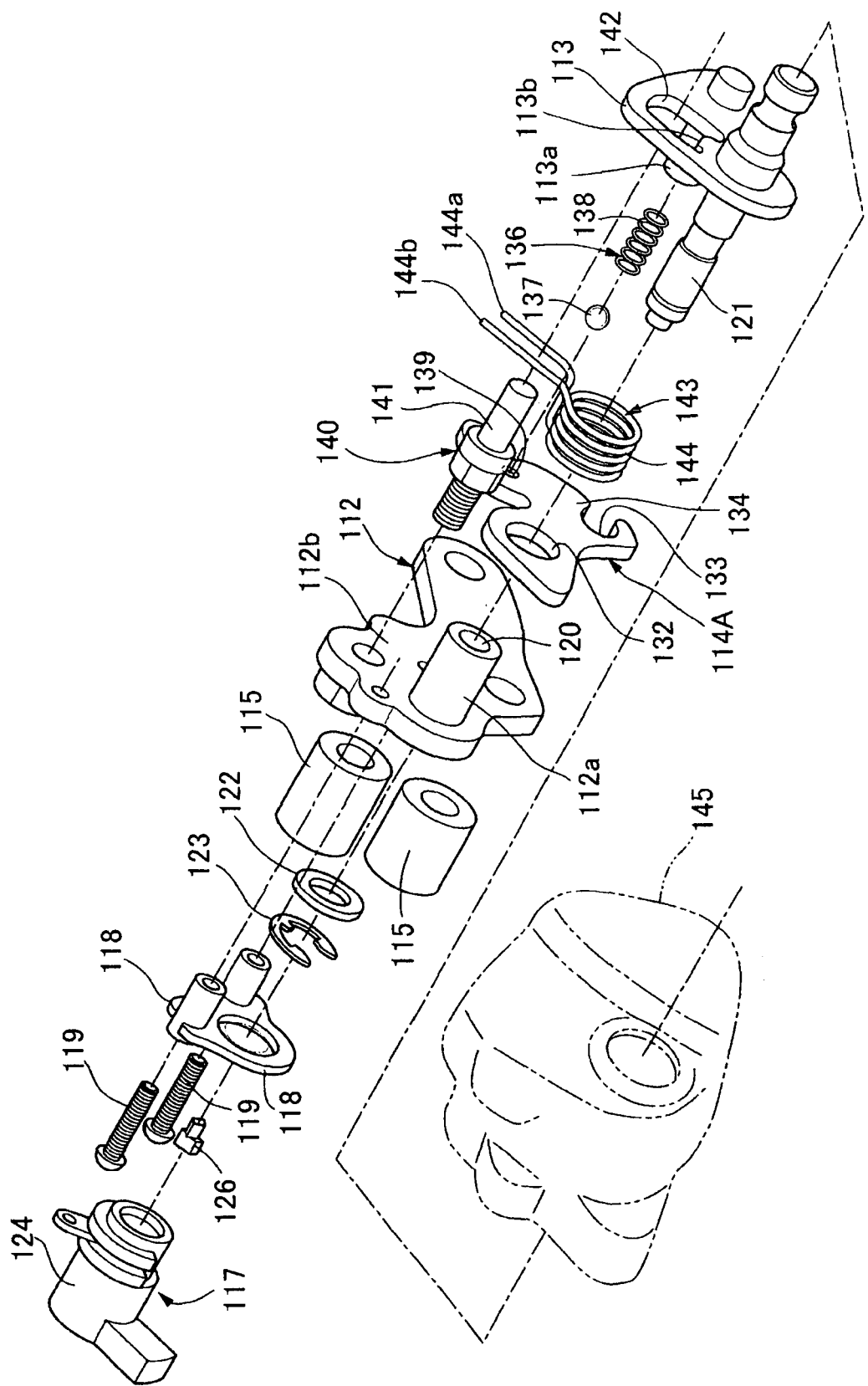
FIG. 8 is an exploded perspective view of the movable part and the detector.

Referring to FIGS. 6 to 8 altogether, a supporting member 112 disposed inside the left pivot frame 24 in the vehicle width direction is attached to the side stand bracket 110 forming part of the vehicle body frame F. The supporting member 112 supports a movable part 114A which includes a movable plate 113 as a movable member interlocking with and connected to the operation pedal 107, and which has at least one of: a click mechanism which adds click feeling to the operation of the operation pedal 107; a stopper mechanism which restricts a turning operation range of the operation pedal 107; and a return mechanism which applies a spring force in a return direction to the operation pedal 107. In the first embodiment, the movable part 114A has a click mechanism 136, a stopper mechanism 140, and a return mechanism 143. The movable part 114A is disposed below the drive shaft 29 which transmits the rotational power from the engine E to the rear wheel WR.

The supporting member 112 is formed to integrally have: a cylindrical supporting tube portion 112*a* forming a supporting hole 120 having an axis extending in the vehicle width direction; and a supporting plate portion 112*b* protruding laterally from a portion of the supporting tube portion 112*a* which is close to its inner end in the vehicle width direction. Multiple, such as a pair of, cylindrical spacers 115, 115 are interposed between the outer face of the side stand bracket 110 and the flat-plate-shaped supporting plate portion 112*b* disposed outside the side stand bracket 110. The supporting plate portion 112*b* of the supporting member 112 is attached to the side stand bracket 110 by a pair of bolts 116A, 116B respectively inserted through the spacers 115, 115.

A gear shift operation using the operation pedal 107 is detected by a detector 117 being, for example, a resistance angle sensor. The gear shift of the transmission 50 is controlled based on the detection result of the detector 117. A sensor stay 118 supporting the detector 117 is fastened to the supporting plate portion 112*b* of the supporting member 112 by using a pair of screw members 119, 119, in such a way that the detector 117 is disposed inside the supporting plate portion 112*b* in the vehicle width direction with an interval between the detector 117 and the supporting plate portion 112*b*.

A turning shaft 121 which turns in accordance with the operation of the operation pedal 107 is turnably fitted to the supporting hole 120 of the supporting member 112. A retaining ring 123 is mounted on an outer periphery of the turning shaft 121 in a portion protruding from an inner end of the supporting hole 120, with a washer 122 interposed between the retaining ring 123 and an inner end of the supporting tube portion 112*a*. A flange portion 121*a* having the supporting tube portion 112*a* of the supporting member 112 interposed between the flange portion 121*a* and the washer 122 is provided in the turning shaft 121. The turning shaft 121 is thus turnably supported by the supporting tube portion 112*a* of the supporting member 112 with the position of the turning shaft 121 in the axial direction kept constant.

An inner end of the turning shaft 121 in the vehicle width direction protrudes inside a case 124 of the detector 117. In the case 124, the turning shaft 121 is connected to a detection shaft 125 of the detector 117 via a joint 126.

One end portion of an arm 127 extending outward in the radial direction of the turning shaft 121 is fastened to an outer end portion of the turning shaft 121 in the vehicle width direction with a bolt 128. One end portion of a link rod 130 extending vertically is turnably connected to an intermediate portion of the arm portion 107*a* in the operation pedal 107 via a first connection pin 129 having an axis parallel to the turning shaft 121. The other end portion of the arm 127 and the other end portion of the link rod 130 are turnably connected to each other via a second connection pin 131 having an axis parallel to the first connection pin 129. Accordingly, the turning shaft 121 turns in accordance with the turning of the operation pedal 107, and the detector 117 detects the turning. The detector 117 thus detects the gear shift operation of shift-up or shift-down performed by using the operation pedal 107.

The movable part 114A includes the movable plate 113 fixed to the turning shaft 121 and a click plate 134 facing the movable plate 113 and fixed to the supporting member 112. An insertion hole 132 and an arc-shaped recessed portion for engagement 133 are provided in the click plate 134 formed to have such a flat plate shape that the click plate 134 comes in contact with the supporting plate portion 112*b* of the supporting member 112, the insertion hole 132 having the supporting tube portion 112*a* of the supporting member 112 inserted therein, the recessed portion for engagement 133 engaging with the bolt 116A out of the pair of bolts 116A, 116B for attaching the supporting plate portion 112*b* of the supporting member 112 to the side stand bracket 110. The bolt 116A out of the bolts 116A, 116B is used to attach the click plate 134 to the side stand bracket 110 together with the supporting plate portion 112*b* while engaging with the recessed portion for engagement 133.

The movable plate 113 is fixedly attached to the turning shaft 121 in such a way as to be in contact with the flange portion 121*a*. A cylindrical portion 113*a* is provided in the movable plate 113, the cylindrical portion 113*a* having a bottomed housing hole 135 opened toward the click plate 134 and having a front end portion thereof facing and located close to the click plate 134.

Figure 9:
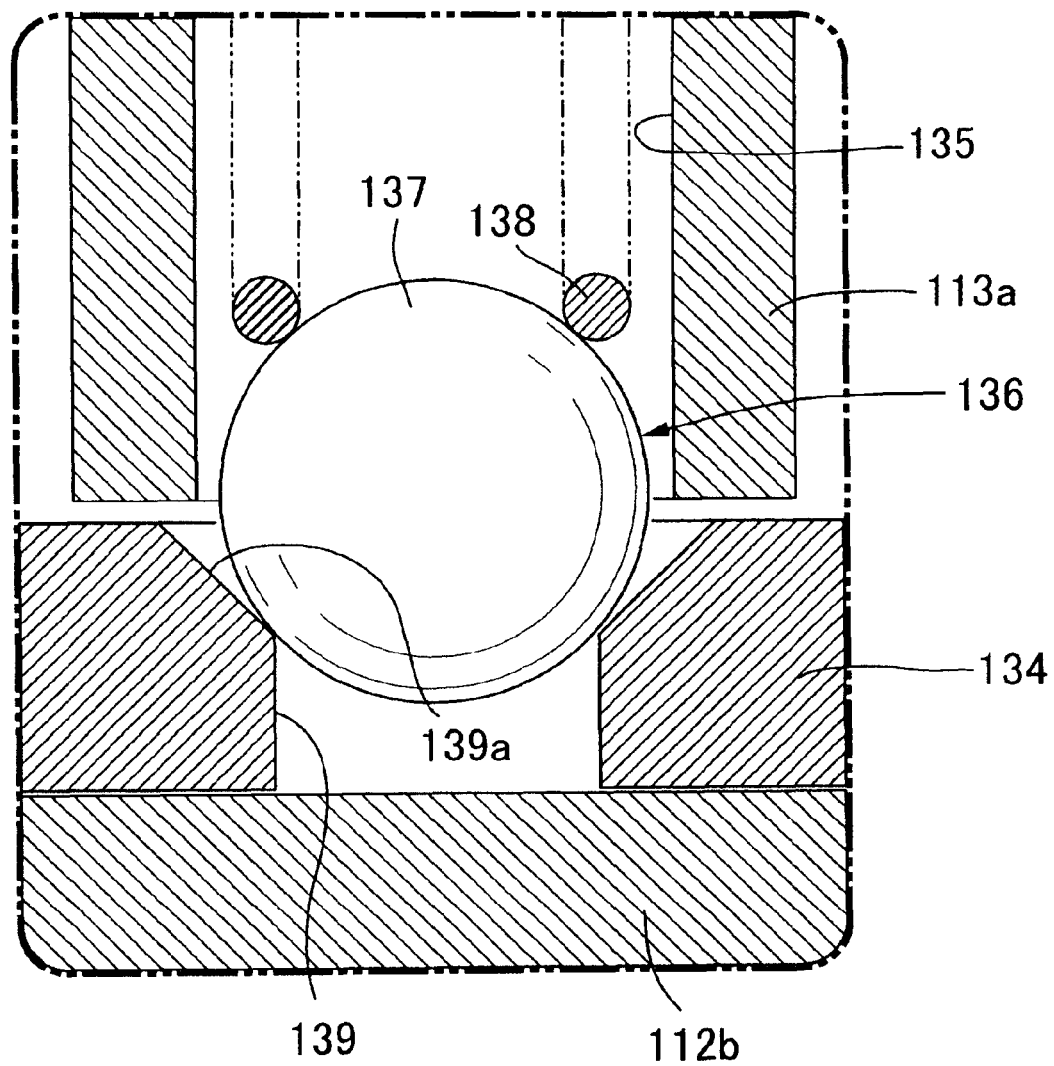
FIG. 9 is an enlarged view of a portion indicated by the arrow 9 of FIG. 7.

In FIG. 9, the movable part 114A includes the click mechanism 136 which gives the click feeling to the operation of the operation pedal 107. The click mechanism 136 is formed of: a click ball 137 which is housed in the front end portion of the housing hole 135; a spring 138 which is housed in the housing hole 135 to bias the click ball 137 toward the click plate 134 and which is provided between the movable plate 113 and the click ball 137 in a compressed manner; and a fitting hole 139 provided in the click plate 134 to allow part of the click ball 137 to be fitted thereto.

A tapered hole portion 139a whose diameter becomes larger toward the movable plate 113 is formed in an end portion of the fitting hole 139 on a side close to the movable plate 113 in such a way that the part of the click ball 137 can be fitted thereto. The fitting hole 139 is provided in the click plate 134 at such a position that the fitting hole 139 is coaxial with the housing hole 135 when the movable plate 113 is at a neutral position corresponding to a non-operated state of the operation pedal 107.

Figure 10:
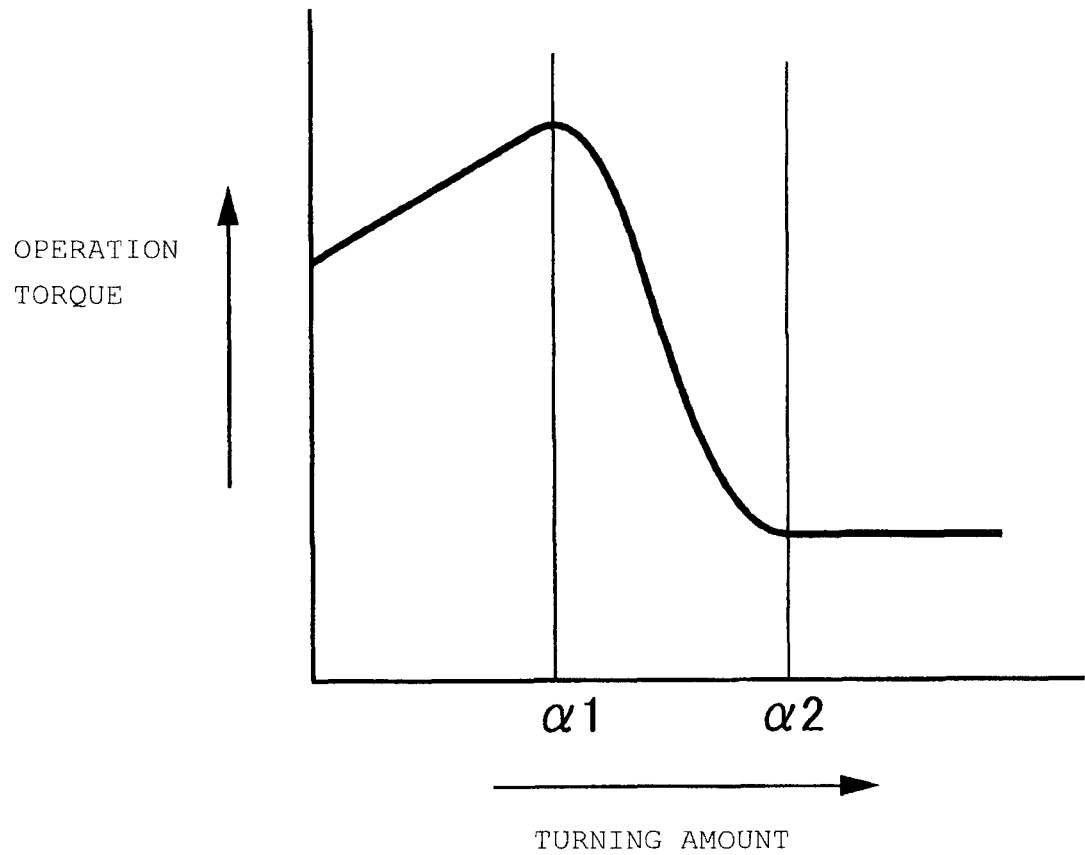
FIG. 10 is a view showing change in an operation torque depending on an operation amount.

Assume a case where the movable plate 113 turns in a shift-up direction or a shift-down direction from the neutral position by the operation of the operation pedal 107. In an initial stage of the turning of the movable plate 113, the click ball 137 climbs the tapered portion 139a while compressing the spring 138. Hence, as shown in FIG. 10, the operation torque gradually becomes larger and reaches the largest value when the turning amount of the movable plate 113 reaches α1 and the click ball 137 climbs to the top of the tapered portion 139a. When the turning amount of the movable plate 113 reaches and becomes larger than α1, the operation torque becomes smaller. Accordingly, the rider operating the operation pedal 107 with his/her foot can sense the click feeling. When the detector 117 detects a turning amount larger than the turning amount α1 at which the operation torque reaches the largest value, a gear shift control device judges that the gear shift operation has been performed.

The movable part 114A also includes the stopper mechanism 140 which restricts the turning operation range of the operation pedal 107. The stopper mechanism 140 is formed of: a stopper pin 141 fixed by being screwed into the supporting plate portion 112b of the supporting member 112; and a restriction hole 142 provided in the movable plate 113 to allow the stopper pin 141 to be inserted therein. The stopper mechanism 140 restricts the turning range of the movable plate 113, i.e. the operation pedal 107 to a range in which the stopper pin 141 can move in the restriction hole 142.

The movable part 114A further includes the return mechanism 143 which applies the spring force in the return direction to the operation pedal 107. The return mechanism 143 is formed by mounting a coil-shaped return spring 144 to the supporting member 112 in such a way that the return spring 144 surrounds the supporting tube portion 112a of the supporting member 112, the return spring 144 having holding pieces 144a, 144b respectively at both end portions which hold a lock protruding portion 113b and the stopper pin 141 from both sides, the lock protruding portion 113b provided integrally in the movable plate 113 to protrude toward the click plate 134 from an edge portion of the restriction hole 142 on a side close to the turning shaft 121. When the movable plate 113 turns in the shift-up direction or the shift-down direction from the neutral position in accordance with the turning operation of the operation pedal 107, a spring force in such a direction that the movable plate 113 is returned to the neutral position, i.e. in such a direction that the operation pedal 107 is returned to the non-operated position acts on the movable plate 113 from one of the holding pieces 144a, 144b of the return spring 144.

As shown in FIG. 6, the operation pedal 107 and the movable part 114A are disposed in such a way that a movable range AM of the movable part 114A in the vehicle width direction is offset inward in the vehicle width direction from a movable range AP1 of the operation pedal 107 in the vehicle width direction and is disposed inside the foot-movement restriction portion 109 in the vehicle width direction. Moreover, as shown in FIG. 5, the operation pedal 107 and the movable part 114A are disposed to partially overlap each other in a side view.

The movable part 114A is covered with a cover 145 and the cover 145 is attached to the click plate 134 to be capable of being detached and attached.

Next, effects of the first embodiment are described. The operation pedal 107 and the movable part 114A are disposed in such a way that the movable range AM of the movable part 114A is offset in the vehicle width direction from the movable range AP1 of the operation pedal 107. Accordingly, the movable part 114A and the operation pedal 107 can be disposed close to each other while being kept from interfering with each other during operation. By reducing the space occupied by the movable part 114A and the operation pedal 107, freedom in layout of the engine E and the vehicle body can be improved.

Moreover, since the operation pedal 107 and the movable part 114A are disposed to partially overlap each other in the side view, the space occupied by the movable part 114A and the operation pedal 107 can be made even smaller.

Furthermore, the foot-movement restriction portion 109 configured to restrict the foot of the rider placed on the operation pedal 107 from moving inward in the vehicle width direction is fixedly disposed inside the operation pedal 107 in the vehicle width direction, and the movable range AM of the movable part 114A in the vehicle width direction is provided inside the foot-movement restriction portion 109. Accordingly, it is possible to avoid interference between the foot of the rider placed on the operation pedal 107 and the movable part 114A.

Moreover, the operation pedal 107 is turnably supported by the step holder 104 attached to the left pivot frame 24 forming part of the vehicle body frame F, and the movable part 114A is disposed inside the left pivot frame 24 in the vehicle width direction, the movable part 114A being supported by the supporting member 112 attached to the vehicle body frame F. Accordingly, the movable part 114A and the operation pedal 107 can be easily disposed to be offset from each other in the vehicle width direction with the movable part 114A being protected.

In addition, the supporting member 112 is attached to the side stand bracket 110 which is fixedly attached to the left pivot frame 24 forming part of the vehicle body frame F to support the side stand 111. This configuration allows the supporting member 112 to be attached to the side stand bracket 110 in a motorcycle equipped with no gear shift control device operated by foot, and facilitates application of the gear shift control device of the present invention.

A second embodiment of the present invention is described with reference to FIGS. 11 and 12. Parts corresponding to those in the first embodiment described above are simply illustrated and denoted by the same reference numerals and detailed descriptions thereof are omitted.

Figure 11:
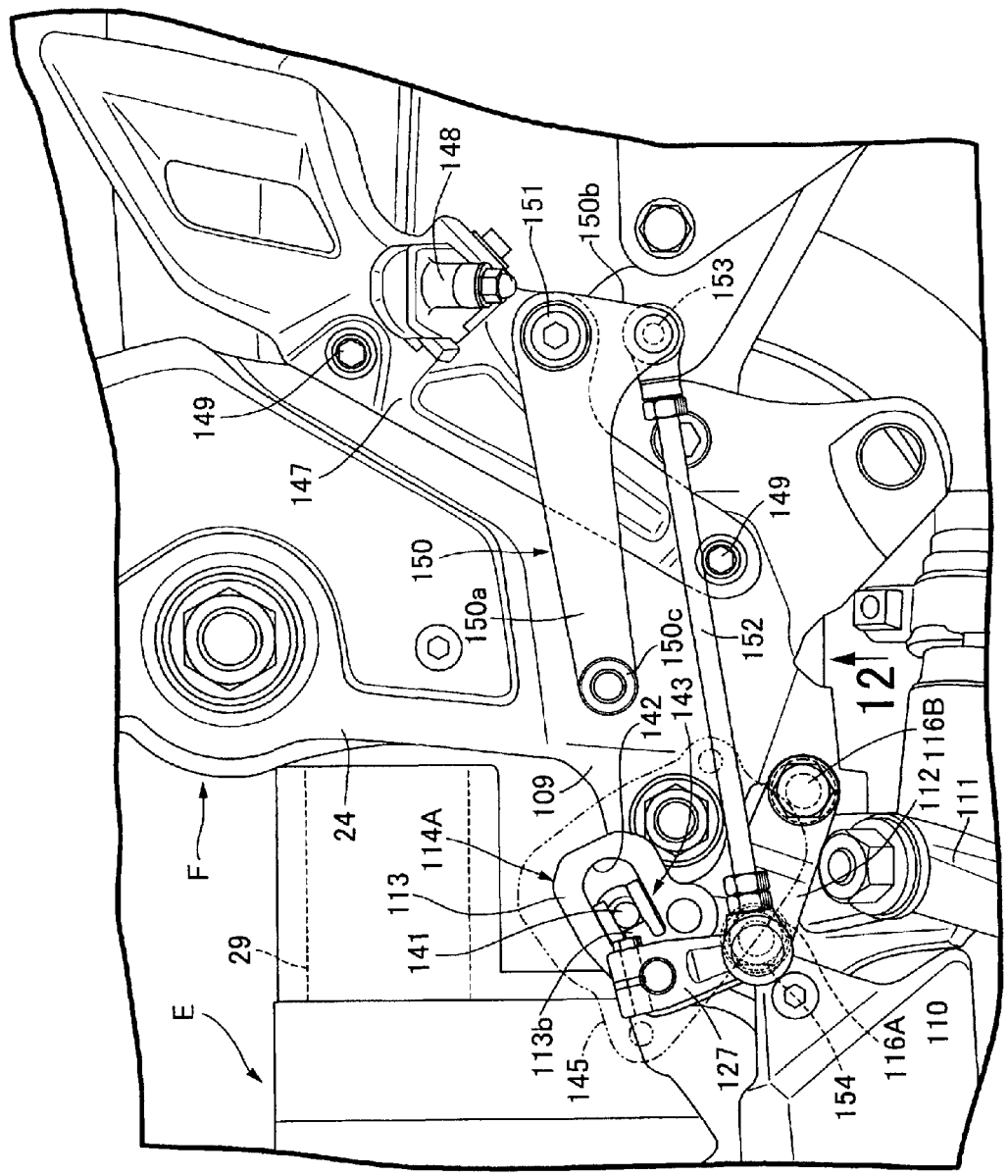
FIG. 11 is a side view of a second embodiment which corresponds to FIG. 5.

First in FIG. 11, a step holder 147 provided with a step 148 for placing the left foot of a rider is attached to a lower rear portion of a left pivot frame 24 forming part of a vehicle body frame F by using, for example, a pair of bolts 149, 149. An operation pedal 150 which can be operated by being turned by the toe of the left foot placed on the step 148 is turnably supported by the step holder 147. The operation pedal 150 is formed of: an arm portion 150a extending in a front-rear direction; a protruding connection portion 150b protruding slightly downward from a rear end of the arm portion 150a; and a pedal portion 150c provided in a front end portion of the arm portion 150a. The rear end portion of the arm portion 150a is turnably supported by a front end portion of the step holder 147 via a supporting shaft 151 having an axis extending in a vehicle width direction.

A supporting member 112 disposed in front of the operation pedal 150, inside the left pivot frame 24 in the vehicle width direction is attached to a side stand bracket 110 fixedly attached to a lower portion of the left pivot frame 24. A movable part 114A having the same configuration as that of the first embodiment is supported by the supporting member 112. The movable part 114A is disposed below a driveshaft 29 which transmits a rotational power from the engine E to the rear wheel WR.

Figure 12:
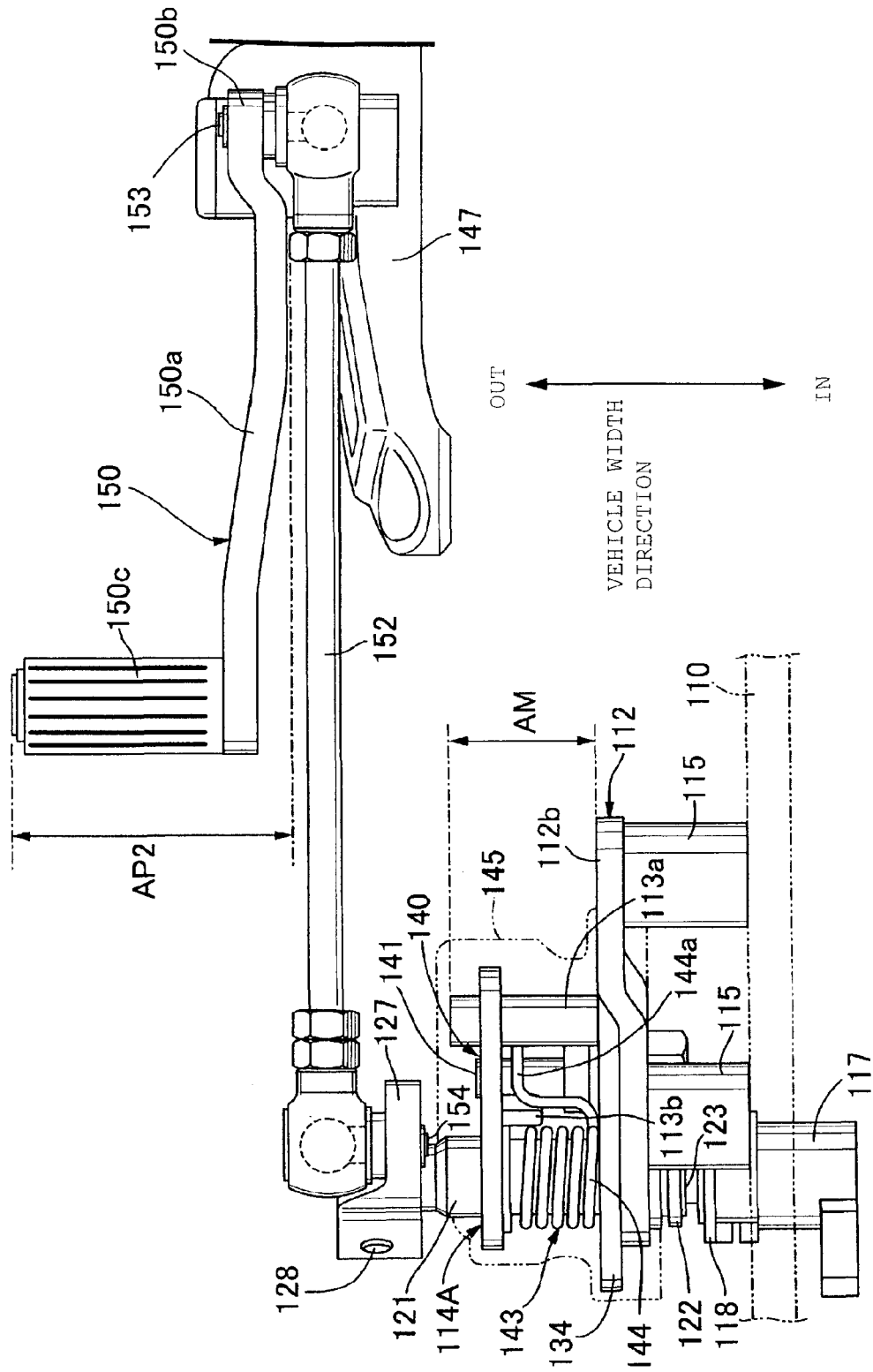
FIG. 12 is a view as seen in a direction of the arrow 12 of FIG. 11.

Referring also to FIG. 12, one end portion of a link rod 152 extending in the front-rear direction is turnably connected to the protruding connection portion 150b in the operation pedal 150 via a first connection pin 153 having an axis parallel to the supporting shaft 151. Meanwhile, the other end portion of the link rod 152 is turnably connected to a front end portion of an arm 127 via a second connection pin 154 having an axis parallel to the first connection pin 153, the arm 127 fixed at its base end portion to an outer end portion of a turning shaft 121 in the vehicle width direction with a bolt 128, the turning shaft 121 connected to a detector 117 and turnably supported by the supporting member 112. Accordingly, the turning shaft 121 turns in accordance with the turning of the operation pedal 150 and the detector 117 detects the turning. The detector 117 thus detects a gear shift operation of shift-up or shift-down performed by using the operation pedal 150.

Moreover, as shown in FIG. 12, the operation pedal 150 and the movable part 114A are disposed in such a way that a movable range AM of the movable part 114A in the vehicle width direction is offset inward in the vehicle width direction from a movable range AP2 of the operation pedal 150 in the vehicle width direction, and is disposed inside a foot-movement restriction portion 109 in the vehicle width direction, the foot-movement restriction portion 109 configured of a lower front portion of the left pivot frame 24.

In the second embodiment, the operation pedal 150 and the movable part 114A are disposed in such a way that the movable range AM of the movable part 114A is offset in the vehicle width direction from the movable range AP2 of the operation pedal 150. Accordingly, the movable part 114A and the operation pedal 150 can be disposed close to each other while being kept from interfering with each other during operation. By reducing the space occupied by the movable part 114A and the operation pedal 150, freedom in layout of the engine E and the vehicle body can be improved.

Moreover, the foot-movement restriction portion 109 configured to restrict the foot of the rider placed on the operation pedal 150 from moving inward in the vehicle width direction is fixedly disposed inside the operation pedal 150 in the vehicle width direction, and the movable range AM of the movable part 114A in the vehicle width direction is disposed inside the foot-movement restriction portion 109 in the vehicle width direction. Accordingly, it is possible to avoid interference between the foot of the rider placed on the operation pedal 150 and the movable part 114A.

Furthermore, the operation pedal 150 is turnably supported by the step holder 147 attached to the left pivot frame 24 forming part of the vehicle body frame F, and the movable part 114A is supported by the supporting member 112 which is disposed inside the left pivot frame 24 in the vehicle width direction and which is attached to the vehicle body frame F. Accordingly, the movable part 114A and the operation pedal 150 can be easily disposed to be offset from each other in the vehicle width direction with the movable part 114A being protected.

In addition, the supporting member 112 is attached to the side stand bracket 110 fixedly attached to the left pivot frame 24. This configuration allows the supporting member 112 to be attached to the side stand bracket 110 in a motorcycle equipped with no gear shift control device operated by foot, and facilitates application of the gear shift control device of the present invention.

A third embodiment of the present invention is described with reference to FIGS. 13 and 14. Parts corresponding to those in the first and second embodiments described above are simply illustrated and denoted by the same reference numerals and detailed descriptions thereof are omitted.

Figure 13:
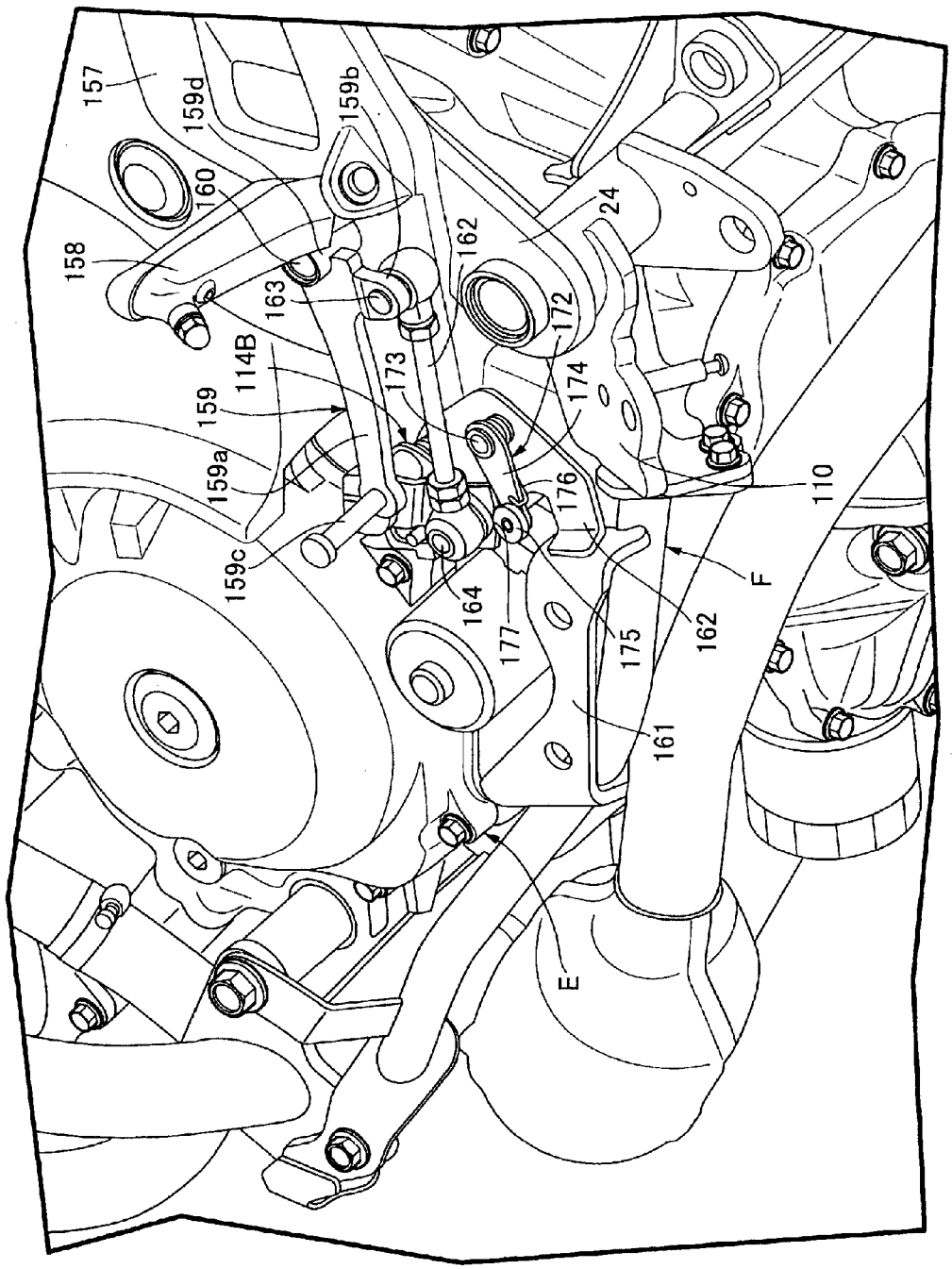
FIG. 13 is a perspective view around a lower portion of an engine of a third embodiment as seen from below.

First in FIG. 13, a step holder 157 provided with a step 158 for placing the left foot of a rider is attached to a lower rear portion of a left pivot frame 24 forming part of a vehicle body frame F. An operation pedal 159 which can be operated by being turned by the toe of the left foot placed on the step 158 is turnably supported by the step holder 157. The operation pedal 159 is formed of: an arm portion 159a extending in a front-rear direction; a protruding connection portion 159b protruding slightly downward from a rear end of the arm portion 159a; and a pedal portion 159c provided in a front end portion of the arm portion 159a. A cylindrical supported portion 159d provided in a rear end portion of the arm portion 159a is turnably supported by a front end portion of the step holder 157 via a supporting shaft 160 having an axis extending in a vehicle width direction.

Meanwhile, a guard frame 161 forming part of the vehicle body frame F is disposed below an engine E mounted on the vehicle body frame F. A supporting member 162 disposed in front of the operation pedal 159, inside the left pivot frame 24 in the vehicle width direction is attached to the guard frame 161. A movable part 114B is supported by the supporting member 162.

Figure 14:
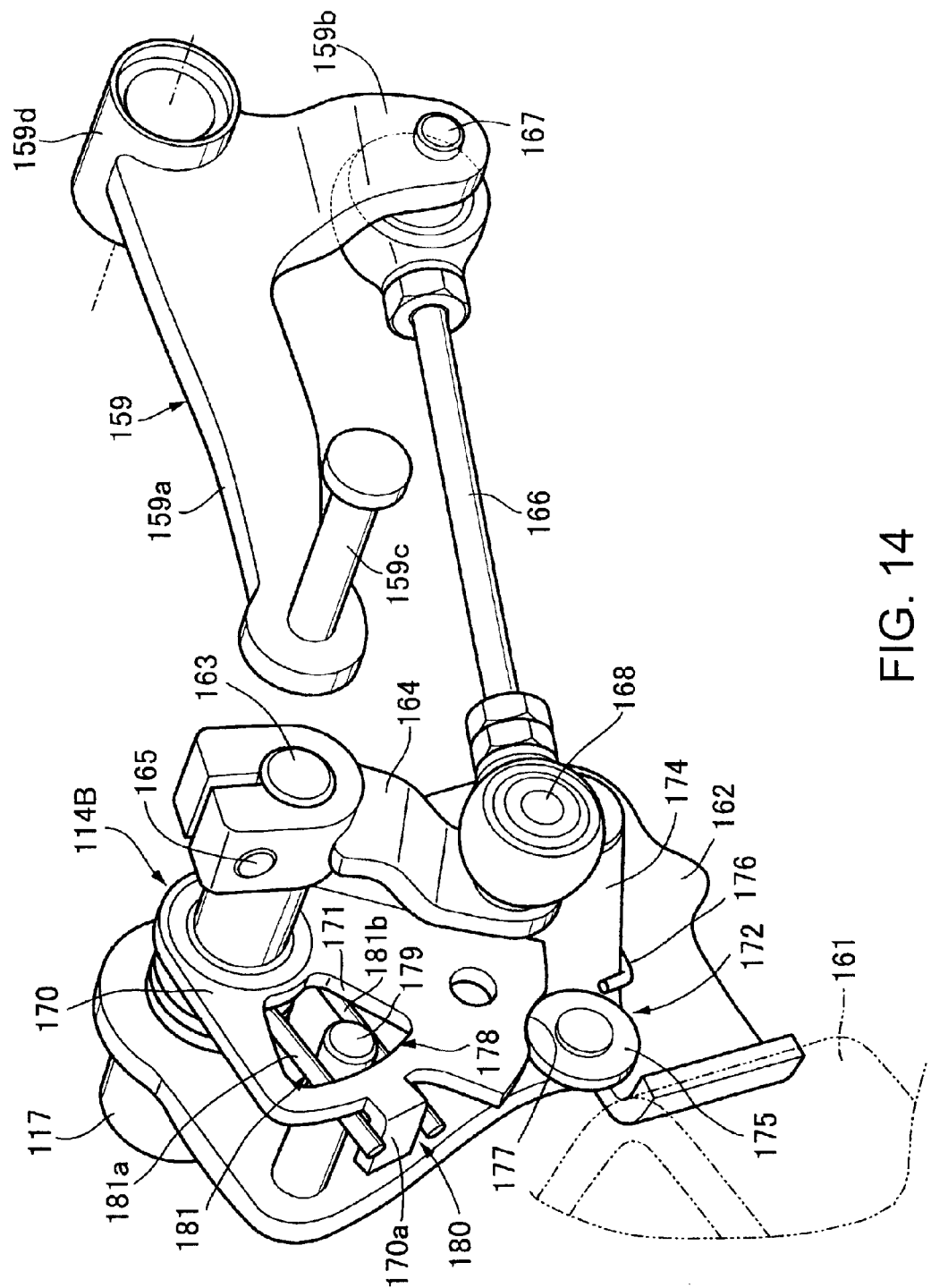
FIG. 14 is an enlarged perspective view of an operation pedal, a movable part, and a detector.

In FIG. 14, a turning shaft 163 connected to the detector 117 supported by the supporting member 162 is turnably supported by the supporting member 162. One end portion of an arm 164 extending outward in a radial direction of the turning shaft 163 is fastened to an outer end portion of the turning shaft 163 in the vehicle width direction with a bolt 165. Meanwhile, one end portion of a link rod 166 extending in the front-rear direction is turnably connected to the protruding connection portion 159b in the operation pedal 159 via a first connection pin 167 having an axis parallel to the turning shaft 163. The other end portion of the arm 164 and the other end portion of the link rod 166 are turnably connected to each other via a second connection pin 168 having an axis parallel to the first connection pin 167. Accordingly, the turning shaft 163 turns in accordance with the turning of the operation pedal 159 and the detector 117 detects the turning. The detector 117 thus detects a gear shift operation of shift-up or shift-down performed by using the operation pedal 159.

The movable part 114B includes a movable plate 170 being a movable member which is fixed to the turning shaft 163 and which faces the supporting member 162 from an outer side in the vehicle width direction. A restriction hole 171 is provided in the movable plate 170.

The movable part 114B includes a click mechanism 172 which gives click feeling to the operation of the operation pedal 159. The click mechanism 172 is formed of: an arm 174 whose base end portion is turnably supported by the supporting member 162 via a supporting shaft 173 (see FIG. 13) having an axis parallel to the turning shaft 163 at a position offset from the axis of the turning shaft 163; a roller 175 which is pivotally supported at a front end portion of the arm 174; a spring 176 which is provided between the arm 174 and the supporting member 162 to exert a spring force biasing the arm 174 in such a direction that the roller 175 is brought into sliding contact with an outer periphery of the movable plate 170; and a recessed portion 177 provided in the outer periphery of the movable plate 170 to allow part of the roller 175 to be fitted thereto when the movable plate 170 is at a neutral position corresponding to a non-operated position of the operation pedal 159.

Assume a case where the movable plate 170 turns in a shift-up direction or a shift-down direction from the neutral position thereof by the operation of the operation pedal 159. In an initial stage of the turning of the movable plate 170, the operation torque gradually becomes larger since the movable plate 170 turns in such a direction that the roller 175 moves away from the recessed portion 177 against the spring force of the spring 176. After the roller 175 moves away from the recessed portion 177, the operation torque becomes small. Accordingly, the rider operating the operation pedal 159 with his/her feet can sense the click feeling.

The movable part 114B also includes a stopper mechanism 178 which restricts the turning operation range of the operation pedal 159. The stopper mechanism 178 is formed by inserting a stopper pin 179 implanted in the supporting member 162 into the restriction hole 171 of the movable plate 170. The stopper mechanism 178 restricts the turning range of the movable plate 170, i.e. the operation pedal 159 to a range in which the stopper pin 179 can move in the restriction hole 171.

The movable part 114B further includes a return mechanism 180 which applies a spring force in a return direction to the operation pedal 159. The return mechanism 180 is formed by mounting a coil-shaped return spring 181 to the supporting member 162 in such a way that the return spring 181 surrounds the turning shaft 163, the return spring 181 having holding pieces 181a, 181b respectively at both end portions which hold a lock protruding portion 170a and the stopper pin 179 from both sides, the lock protruding portion 170a provided integrally in the movable plate 170 to protrude inward in the vehicle width direction from an outer peripheral edge of the movable plate 170 at a position corresponding to the restriction hole 171. When the movable plate 170 turns in the shift-up direction or the shift-down direction from the neutral position in accordance with the turning operation of the operation pedal 159, a spring force in such a direction that the movable plate 170 is returned to the neutral position, i.e. in such a direction that the operation pedal 159 is returned to the non-operated position acts on the movable plate 170 from one of the holding pieces 181a, 181b of the return spring 181.

The operation pedal 159 and the movable part 114B are disposed in such a way that a movable range of the movable part 114B in the vehicle width direction is offset inward in the vehicle width direction from a movable range of the operation pedal 159 in the vehicle width direction, and is disposed inside the foot-movement restriction portion 109, which is formed of part of the left pivot frame 24, in the vehicle width direction.

Effects similar to those of the second embodiment described above can be obtained from the third embodiment.

Figure 15:
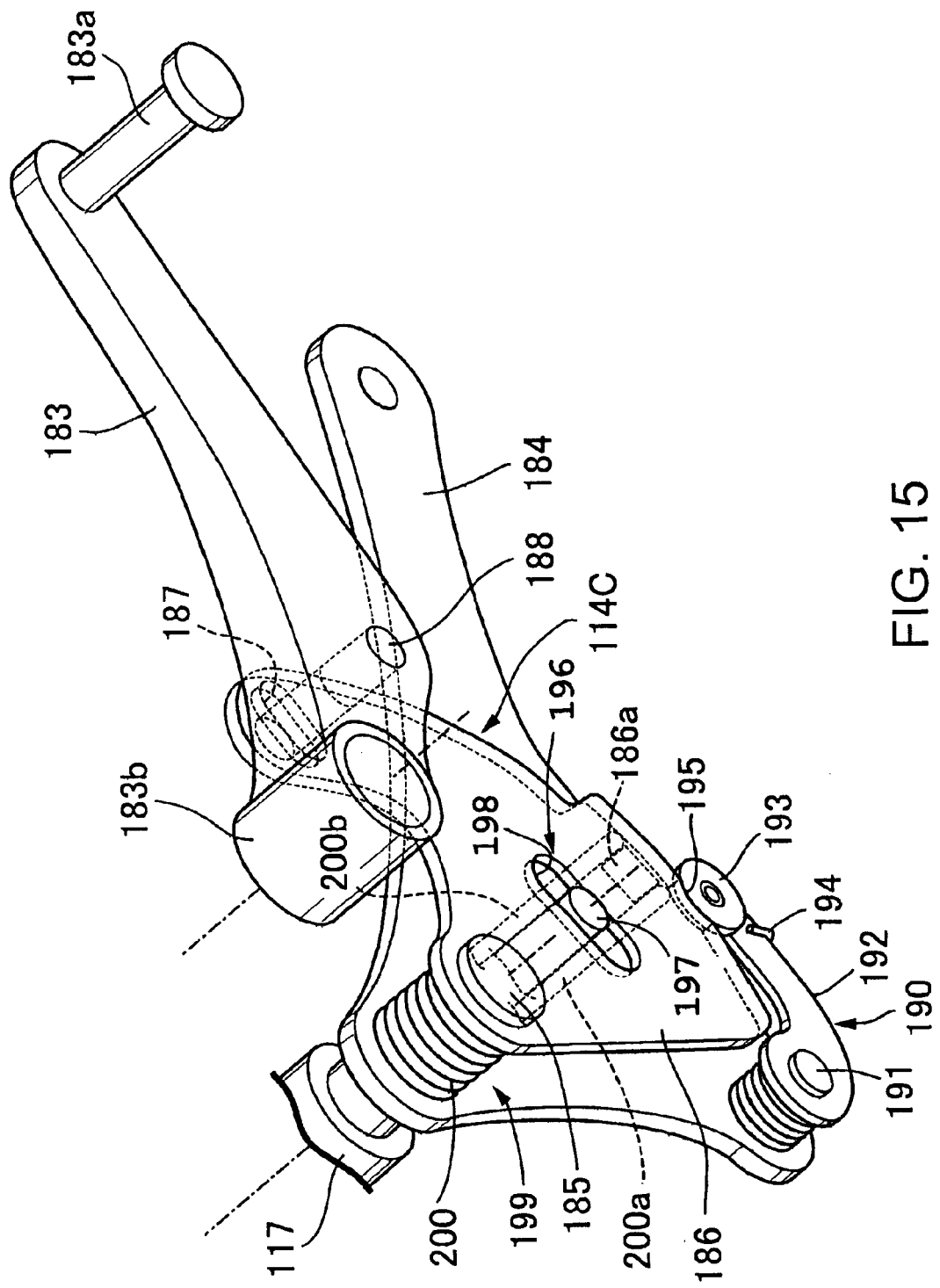
FIG. 15 is a perspective view of an operation pedal, a movable part, and a detector of a fourth embodiment as seen from above.

A fourth embodiment of the present invention is described with reference to FIG. 15. A cylindrical operated portion 183b is turnably supported by an unillustrated vehicle body frame, the operated portion 183b provided in a front end portion of an operation pedal 183 having a pedal portion 183a in its rear end portion and extending in a front-rear direction. A supporting member 184 disposed inside the operation pedal 183 in the vehicle width direction is attached to, for example, the side stand bracket 110 of the first and second embodiments.

A turning shaft 185 connected to a detector 117 supported by the supporting member 184 is turnably supported by the supporting member 184. A movable part 114C supported by the supporting member 184 is formed by fixing a movable plate 186 being a movable member to an outer end portion of the turning shaft 185 in the vehicle width direction in such a way that the movable plate 186 faces the supporting member 184.

A connection hole 187 is provided in the movable plate 186 at a position offset from the center axis of the turning shaft 185 and a connection pin 188 implanted in an intermediate portion of the operation pedal 183 in the front-rear direction is inserted in the connection hole 187. This causes the movable plate 186 and the turning shaft 185 to turn in accordance with the turning of the operation pedal 183 and the detector 117 detects the turning. Accordingly, the detector 117 detects a gear shift operation of shift-up or shift-down performed by using the operation pedal 183. In addition, the connection hole 187 is formed to have an elongated shape to allow the connection pin 188 to move in the connection hole 187 as the distance between the connection pin 188 and the turning shaft 185 changes according to the turning of the operation pedal 183.

The movable part 114C includes a click mechanism 190 which gives click feeling to the operation of the operation pedal 183. The click mechanism 190 is formed of: an arm 192 whose base end portion is turnably supported by the supporting member 184 via a supporting shaft 191 having an axis parallel to the turning shaft 185 at a position offset from the axis of the turning shaft 185; a roller 193 which is pivotally supported at a front end portion of the arm 192; a spring 194 which is provided between the arm 192 and the supporting member 184 to exert a spring force biasing the arm 192 in such a direction that the roller 193 is brought into sliding contact with an outer periphery of the movable plate 186; and a recessed portion 195 provided in the outer periphery of the movable plate 186 to allow part of the roller 193 to be fitted thereto when the movable plate 186 is at a neutral position corresponding to a non-operated position of the operation pedal 183.

Assume a case where the movable plate 186 turns in a shift-up direction or a shift-down direction from the neutral position thereof by the operation of the operation pedal 183. In an initial stage of the turning of the movable plate 186, the operation torque gradually becomes larger since the movable plate 186 turns in such a direction that the roller 193 moves away from the recessed portion 195 against the spring force of the spring 194. After the roller 193 moves away from the recessed portion 195, the operation torque becomes small. Accordingly, the rider operating the operation pedal 183 with his/her feet can sense the click feeling.

The movable part 114C also includes a stopper mechanism 196 which restricts the turning operation range of the operation pedal 183. The stopper mechanism 196 is formed by inserting a stopper pin 197 implanted in the supporting member 184 into a restriction hole 198 provided in the movable plate 186. The stopper mechanism 196 restricts the turning range of the movable plate 186, i.e. the operation pedal 183 to a range in which the stopper pin 197 can move in the restriction hole 198.

The movable part 114C further includes a return mechanism 199 which applies a spring force in a return direction to the operation pedal 183. The return mechanism 199 is formed by mounting a coil-shaped return spring 200 in such a way that the return spring 200 surrounds the turning shaft 185, the return spring 200 having holding pieces 200a, 200b respectively at both end portions which hold a lock protruding portion 186a and the stopper pin 197 from both sides, the lock protruding portion 186a provided integrally in an outer peripheral edge portion of the movable plate 186 at a position corresponding to the restriction hole 198. When the movable plate 186 turns in the shift-up direction or the shift-down direction from the neutral position in accordance with the turning operation of the operation pedal 183, a spring force in such a direction that the movable plate 186 is returned to the neutral position, i.e. in such a direction that the operation pedal 183 is returned to the non-operated position acts on the movable plate 186 from one of the holding pieces 200a, 200b of the return spring 200.

The operation pedal 183 and the movable part 114C are disposed in such a way that a movable range of the movable part 114C in the vehicle width direction is offset inward in the vehicle width direction from a movable range of the operation pedal 183 in the vehicle width direction.

Effects similar to those of the third embodiment described above can be obtained from the fourth embodiment. In addition, since the operation pedal 183 and the movable part 114C is disposed to partially overlap each other in a side view, a space occupied by the movable part 114C and the operation pedal 183 can be made even smaller.

Figure 16:
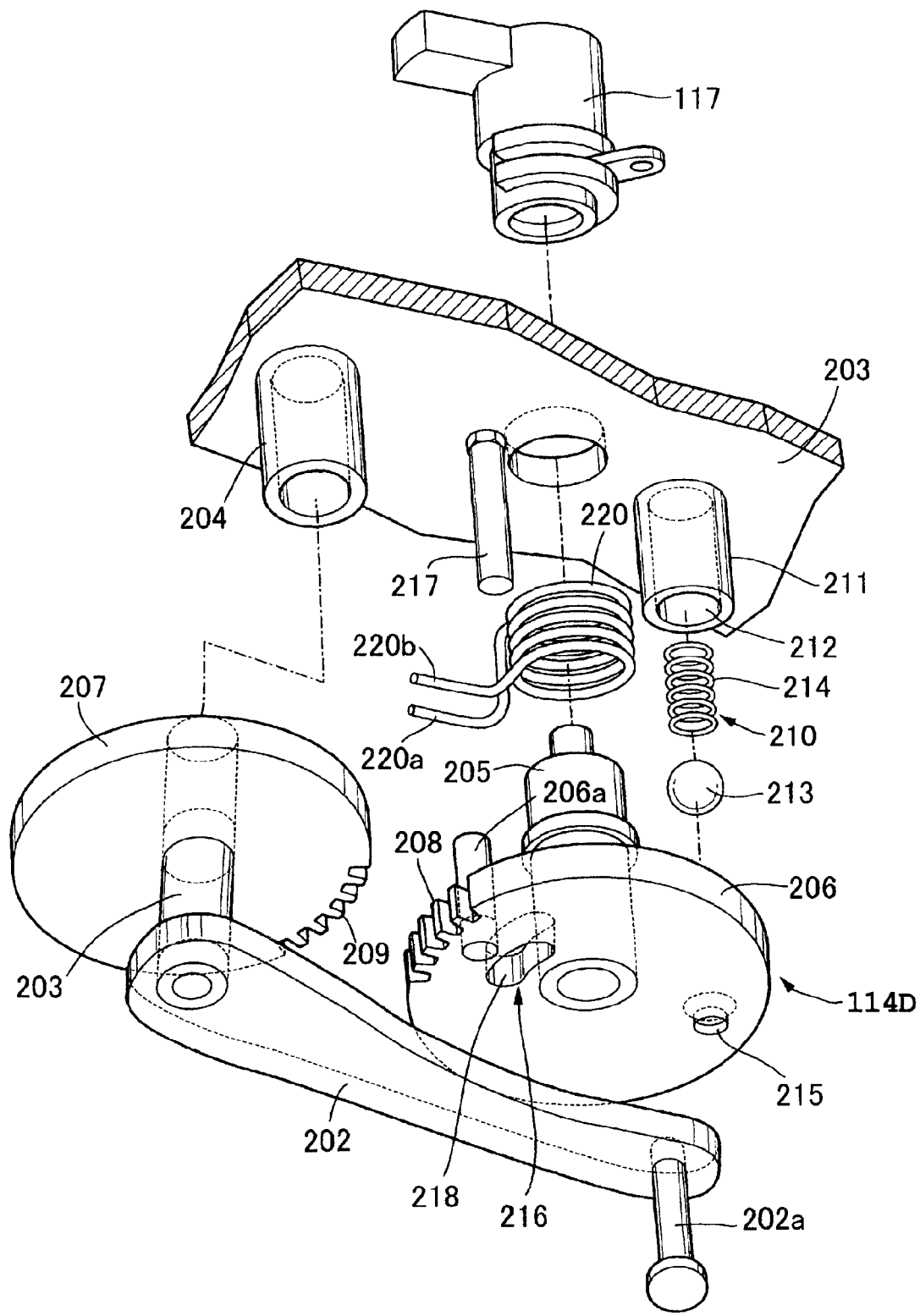
FIG. 16 is an exploded perspective view of an operation pedal, a movable part, and a detector of a fifth embodiment.

A fifth embodiment of the present invention is described with reference to FIG. 16. A shaft 203 is fixed to a front end portion of an operation pedal 202 having a pedal portion 202a in its rear end portion and extending in a front-rear direction. The shaft 203 is fitted to and supported by a fitting tube portion 204 provided in a supporting member 203 fixedly disposed inside the operation pedal 202 in the vehicle width direction.

A turning shaft 205 connected to a detector 117 supported by the supporting member 203 is turnably supported by the supporting member 203. A movable part 114D supported by the supporting member 203 is formed by fixing a circular movable plate 206 being a movable member to an outer end portion of the turning shaft 205 in the vehicle width direction in such a way that the movable plate 206 faces the supporting member 203.

A circular transmission plate 207 is fixed to the shaft 203 in such a way that an outer periphery of the transmission plate 207 faces an outer periphery of the movable plate 206. Multiple teeth 209 meshing with multiple teeth 208 engraved in the outer periphery of the movable plate 206 are engraved in the outer periphery of the transmission plate 207. Hence, the movable plate 206 and the turning shaft 205 turn in accordance with the turning of the operation pedal 202 and the turning is detected by the detector 117. Accordingly, the detector 117 detects a gear shift operation of shift-up or shift-down performed by using the operation pedal 202.

The movable part 114D includes a click mechanism 210 which gives click feeling to the operation of the operation pedal 202. The click mechanism 210 is formed of: a click ball 213 which is housed in a front end portion of a bottomed housing hole 212 formed in a supporting tube portion 211 fixedly attached to the supporting member 203; a spring 214 which is housed in the housing hole 212 to bias the click ball 213 toward the movable plate 206 and which is provided between the supporting member 203 and the click ball 213 in a compressed manner; and a fitting hole 215 provided in the movable plate 206 to allow part of the click ball 213 to be fitted thereto.

The movable part 114D also includes a stopper mechanism 216 which restricts the turning operation range of the operation pedal 202. The stopper mechanism 216 is formed by inserting a stopper pin 217 implanted in the supporting member 203 into a restriction hole 218 provided in the movable plate 206. The stopper mechanism 216 restricts the turning range of the movable plate 206, i.e. the operation pedal 202 to a range in which the stopper pin 217 can move in the restriction hole 218.

The movable part 114D further includes a return mechanism 219 which applies a spring force in a return direction to the operation pedal 202. The return mechanism 219 is formed by disposing a coil-shaped return spring 220 in such a way that the return spring 220 surrounds the turning shaft 205, the return spring 220 having holding pieces 220a, 220b respectively at both end portions which hold the stopper pin 217 and a lock protruding portion 206a from both sides, the lock protruding portion 206a provided integrally in the movable plate 206. When the movable plate 206 turns in a shift-up direction or a shift-down direction from a neutral position in accordance with the turning operation of the operation pedal 202, a spring force in such a direction that the movable plate 206 is returned to the neutral position, i.e. in such a direction that the operation pedal 202 is returned to the non-operated position acts on the movable plate 206 from one of the holding pieces 220a, 220b of the return spring 220.

Moreover, the operation pedal 202 and the movable part 114D are disposed in such a way that a movable range of the movable part 114D in the vehicle width direction is offset inward in the vehicle width direction from a movable range of the operation pedal 202 in the vehicle width direction. In addition, the operation pedal 202 and the movable part 114D are disposed to partially overlap each other in a side view.

Effects similar to those of the fourth embodiment described above can be obtained from the fifth embodiment.

Figure 17:
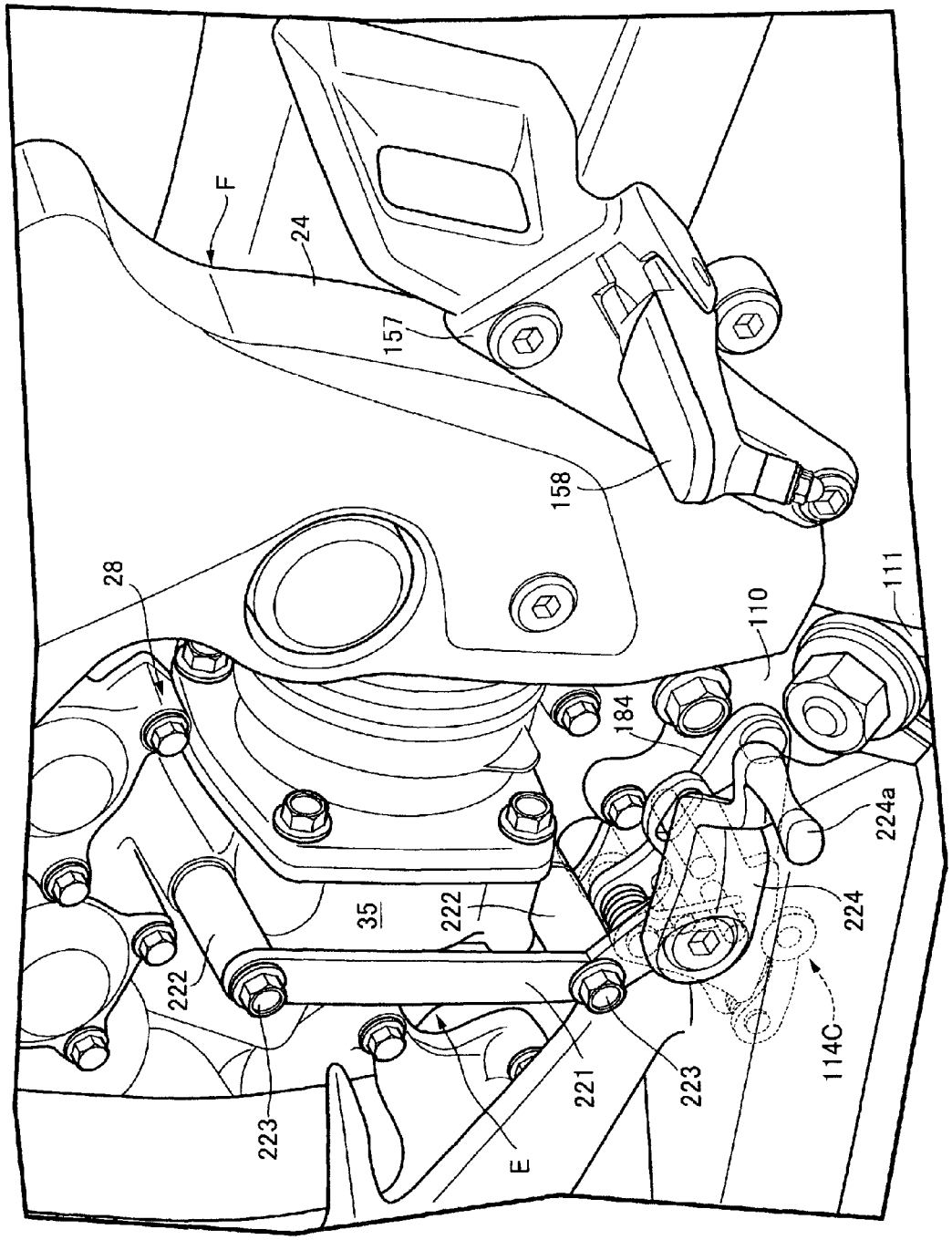
FIG. 17 is a perspective view around a lower portion of an engine of a sixth embodiment as seen from above.

A sixth embodiment of the present invention is described with reference to FIG. 17. A step holder 157 provided with a step 158 for placing the left foot of a rider is attached to a lower rear portion of a left pivot frame 24 forming part of a vehicle body frame F. Meanwhile, a bracket 221 is arranged lateral to a crankcase 35 in an engine main body 28 of an engine E mounted on the vehicle body frame F, by being fixed to the crankcase 35. Specifically, the bracket 221 is fixed to the crankcase 35 by using bolts 223, 233 with a pair of cylindrical spacers 222, 222 interposed between the bracket 221 and the crankcase 35.

A front end portion of an operation pedal 224 is turnably supported by the bracket 221, the operation pedal 224 having, at its rear end portion, a pedal portion 224a operated by the toe of the foot placed on the step 158.

A supporting member 184 is attached to a side stand bracket 110 turnably supporting the side stand 111 and attached to a lower portion of the left pivot frame 24. A movable part 114C is supported by the supporting member 184 to be disposed below the engine main body 28.

In the sixth embodiment, the operation pedal 224 is turnably supported by the bracket 221 fixedly attached to the crankcase 35 of the engine main body 28 and arranged lateral to the engine main body 28. The movable part 114C is disposed below the engine main body 28. Accordingly, the operation pedal 224 and the movable part 114C can be easily disposed to be offset from each other in the vehicle width direction.

The embodiments of the present invention have been descried above. However, the present invention is not limited by the embodiment described above and various design changes can be made without departing from the present invention described in the scope of claims.

We claim:

1. A gear shift control device of a saddle ride type vehicle, comprising:
   an operation pedal which is operated by the foot of a rider to perform a gear shift;
   a movable part which includes a movable member interlocking with and connected to the operation pedal, and which also includes,
      at least one click mechanism configured to give a click feeling to an operation of the operation pedal,
      a stopper mechanism configured to restrict a turning operation range of the operation pedal, and
      a return mechanism configured to apply a spring force in a return direction to the operation pedal; and
   a detector which detects a gear shift operation performed by using the operation pedal, the gear shift control device configured to make a transmission perform a gear shift on the basis of a detection result of the detector,
   wherein the operation pedal and the movable part are disposed in such a way that a movable range of the movable part is offset from a movable range of the operation pedal in a vehicle width direction, and
   wherein the operation pedal and the movable part are disposed in order to partially overlap each other in a side view.

2. The gear shift control device of a saddle ride type vehicle according to claim 1, wherein
   a foot-movement restriction portion, configured to restrict the foot of the rider placed on the operation pedal from moving inward in the vehicle width direction, is fixedly disposed inside the operation pedal in the vehicle width direction, and
   the movable range of the movable part in the vehicle width direction is disposed inside the foot-movement restriction portion in the vehicle width direction.

3. The gear shift control device of a saddle ride type vehicle according to claim 2, wherein
   the operation pedal is turnably supported by a step holder attached to a pivot frame which forms part of a vehicle body frame while swingably supporting a front end portion of a swing arm whose rear end portion pivotally supports a rear wheel, and
   the movable part is supported by a supporting member disposed inside the pivot frame in the vehicle width direction and is attached to the vehicle body frame.

4. The gear shift control device of a saddle ride type vehicle according to claim 3, wherein the supporting member is attached to a side stand bracket fixedly attached to the vehicle body frame to support a side stand.

5. The gear shift control device of a saddle ride type vehicle according to claim 2, wherein
   the operation pedal is turnably supported by a bracket which is fixedly attached to an engine main body mounted on a vehicle body frame and which is arranged lateral to the engine main body, and
   the movable part is disposed below the engine main body.

6. The gear shift control device of a saddle ride type vehicle according to claim 1, wherein
   the operation pedal is turnably supported by a step holder attached to a pivot frame which forms part of a vehicle body frame while swingably supporting a front end portion of a swing arm whose rear end portion pivotally supports a rear wheel, and
   the movable part is supported by a supporting member disposed inside the pivot frame in the vehicle width direction and is attached to the vehicle body frame.

7. The gear shift control device of a saddle ride type vehicle according to claim 6, wherein the supporting member is attached to a side stand bracket fixedly attached to the vehicle body frame to support a side stand.

8. The gear shift control device of a saddle ride type vehicle according to claim 1, wherein
   the operation pedal is turnably supported by a bracket which is fixedly attached to an engine main body mounted on a vehicle body frame and which is arranged lateral to the engine main body, and
   the movable part is disposed below the engine main body.

9. The gear shift control device of a saddle ride type vehicle according to claim 1, wherein the movable range of the movable part and the movable range of the operation pedal do not overlap in a vehicle width direction.

10. The gear shift control device of a saddle ride type vehicle according to claim 1, wherein the movable range of the movable part and the movable range of the operation pedal are offset in a vehicle width direction with a space therebetween.

11. A gear shift control device of a saddle ride type vehicle, comprising:
    an operation pedal which is operated by the foot of a rider to perform a gear shift;
    a movable part which includes a movable member interlocking with and connected to the operation pedal, and which also includes,
       at least one click mechanism configured to give a click feeling to an operation of the operation pedal,
       a stopper mechanism configured to restrict a turning operation range of the operation pedal, and
       a return mechanism configured to apply a spring force in a return direction to the operation pedal; and
    a detector which detects a gear shift operation performed by using the operation pedal, the gear shift control device configured to make a transmission perform a gear shift on the basis of a detection result of the detector,
    wherein the operation pedal and the movable part are disposed in such a way that a movable range of the movable part is offset from a movable range of the operation pedal in a vehicle width direction,
    wherein a foot-movement restriction portion, configured to restrict the foot of the rider placed on the operation pedal from moving inward in the vehicle width direction, is fixedly disposed inside the operation pedal in the vehicle width direction, and
    wherein the movable range of the movable part in the vehicle width direction is disposed inside the foot-movement restriction portion in the vehicle width direction.

12. The gear shift control device of a saddle ride type vehicle according to claim 11, wherein the operation pedal and the movable part are disposed in order to partially overlap each other in a side view.

13. The gear shift control device of a saddle ride type vehicle according to claim 11, wherein
    the operation pedal is turnably supported by a bracket which is fixedly attached to an engine main body mounted on a vehicle body frame and which is arranged lateral to the engine main body, and
    the movable part is disposed below the engine main body.

14. The gear shift control device of a saddle ride type vehicle according to claim 12, wherein
the operation pedal is turnably supported by a step holder attached to a pivot frame which forms part of a vehicle body frame while swingably supporting a front end portion of a swing arm whose rear end portion pivotally supports a rear wheel, and
the movable part is supported by a supporting member disposed inside the pivot frame in the vehicle width direction and is attached to the vehicle body frame.

15. The gear shift control device of a saddle ride type vehicle according to claim 14, wherein the supporting member is attached to a side stand bracket fixedly attached to the vehicle body frame to support a side stand.

16. The gear shift control device of a saddle ride type vehicle according to claim 12, wherein
the operation pedal is turnably supported by a bracket which is fixedly attached to an engine main body mounted on the vehicle body frame and which is arranged lateral to the engine main body, and
the movable part is disposed below the engine main body.

17. The gear shift control device of a saddle ride type vehicle according to claim 11, wherein
the operation pedal is turnably supported by a step holder attached to a pivot frame which forms part of a vehicle body frame while swingably supporting a front end portion of a swing arm whose rear end portion pivotally supports a rear wheel, and
the movable part is supported by a supporting member disposed inside the pivot frame in the vehicle width direction and is attached to the vehicle body frame.

18. The gear shift control device of a saddle ride type vehicle according to claim 17, wherein the supporting member is attached to a side stand bracket fixedly attached to the vehicle body frame to support a side stand.

19. The gear shift control device of a saddle ride type vehicle according to claim 11, wherein the movable range of the movable part and the movable range of the operation pedal do not overlap in a vehicle width direction.

20. The gear shift control device of a saddle ride type vehicle according to claim 11, wherein the movable range of the movable part and the movable range of the operation pedal are offset in a vehicle width direction with a space therebetween.

* * * * *